US011418973B2

(12) United States Patent
Cheraghi et al.

(10) Patent No.: US 11,418,973 B2
(45) Date of Patent: Aug. 16, 2022

(54) HIERARCHICAL BEAM SEARCH

(71) Applicant: QUALCOMM Incorporated, San Diego, CA (US)

(72) Inventors: Parisa Cheraghi, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 16/554,130

(22) Filed: Aug. 28, 2019

(65) Prior Publication Data
US 2021/0067978 A1 Mar. 4, 2021

(51) Int. Cl.
*H04W 16/28* (2009.01)
*H04B 17/336* (2015.01)
*H04L 5/00* (2006.01)
*H04W 24/08* (2009.01)
*H04W 24/10* (2009.01)
*H04W 56/00* (2009.01)
*H04W 72/04* (2009.01)

(52) U.S. Cl.
CPC .......... *H04W 16/28* (2013.01); *H04B 17/336* (2015.01); *H04L 5/0051* (2013.01); *H04W 24/08* (2013.01); *H04W 24/10* (2013.01); *H04W 56/001* (2013.01); *H04W 72/046* (2013.01)

(58) Field of Classification Search
CPC ..... H04W 16/28; H04W 24/08; H04W 24/10; H04W 56/001; H04W 72/046; H04B 17/336; H04L 5/0051
See application file for complete search history.

(56) References Cited

U.S. PATENT DOCUMENTS

2011/0090817 A1* 4/2011 Qu .................. H04L 5/001
370/254
2018/0227031 A1 8/2018 Guo et al.

FOREIGN PATENT DOCUMENTS

WO WO-2019032853 A1 * 2/2019 ............ H04B 7/0617
WO WO-2019047945 A1 * 3/2019 ............ H04L 5/005

OTHER PUBLICATIONS

International Search Report and Written Opinion—PCT/US2020/048640—ISA/EPO—dated Oct. 28, 2020 (192377WO).

* cited by examiner

*Primary Examiner* — Natasha W Cosme
(74) *Attorney, Agent, or Firm* — Holland & Hart LLP

(57) ABSTRACT

Methods, systems, and devices for wireless communications are described. A user equipment (UE) may utilize synchronization signal block (SSB) and channel state information reference signal (CSI-RS) based beam management to select beams for communicating with a base station. For example, a UE may receive, from a base station, control signaling that configures the UE to monitor a set of SSBs and a set of reference signals. The UE may select a subset of the set of SSBs based on measuring a first signal metric for each SSB of the set of SSBs. In some examples, the UE may select a reference signal subset of the set of reference signals that correspond to the subset of the set SSBs, and may communicate a data transmission with the base station using a first beam selected based on measuring a second signal metric for each reference signal in the reference signal subset.

30 Claims, 19 Drawing Sheets

HIERARCHICAL BEAM SEARCH

TECHNICAL FIELD

The following relates generally to wireless communications, and more specifically to hierarchical beam search.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

By way of example, a wireless multiple-access communications system may include a number of base stations or network access nodes, each simultaneously supporting communication for multiple communication devices, which may be otherwise known as user equipment (UE). A base station may communicate with the communications devices on downlink channels (e.g., for transmissions from a base station to a UE) and uplink channels (e.g., for transmissions from a UE to a base station).

Various communications systems may use different beams and multiple antennas for communicating signals between transmitters and receivers. For example, multiple antennas at the base station and UE may be used to take advantage of antenna diversity schemes that may improve factors such as communication rate or reliability. Additionally, directional beamforming techniques may enable a transmitter to transmit a signal onto a particular propagation path, and may enable a receiver to receive a signal from a particular propagation path. In such cases, more than one signal propagation path may exist between UEs and base stations, and a UE and base station may track and select between various beams for communication. However, conventional beam selection techniques are deficient.

SUMMARY

The described techniques relate to improved methods, systems, devices, and apparatuses that support hierarchical beam search. Generally, the described techniques provide for adaptive channel state information reference signal (CSI-RS) beam sub-selection based on synchronization signal block (SSB) beam selection. In wireless communications, multiple-access systems may provide for various types of beam management supportive of communications between transmitting and receiving devices. In some wireless communications systems, more than one signal propagation path may exist between communication devices such as a user equipment (UE) and base stations. A UE and base station may track and select between various beams for communication, and some example techniques may provide for beam selection based on factors such as signal strength and signal quality associated with each beam. In accordance with the techniques described herein, a subset of a large number of narrow beams may be tracked to save processing power and memory usage of a receiving device.

A receiving device (e.g., a UE) may use a combination of SSB based beam management and reference signal (e.g., CSI-RS) based beam management to select beams for data transmissions with a base station. The UE may identify a first set of beams (e.g., a set of wide beams) based on measurements of signal metrics (e.g., reference signal receive power (RSRP)) for a set of SSBs, and may monitor a subset of a second set of beams (e.g., a set of narrow beams) based on quasi co-location (QCL) relationships between the second set of beams and the first set of beams. Accordingly, computational complexity may be reduced, as the UE may selectively track or monitor narrow beams based on whether the narrow beams have a QCL relationship with a wide beam having a relatively high RSRP.

A method of wireless communications by a UE is described. The method may include receiving, from a base station, control signaling that configures the UE to monitor a set of synchronization signal blocks and a set of reference signals, selecting a subset of the set of synchronization signal blocks based on measuring a first signal metric for each synchronization signal block of the set of synchronization signal blocks, selecting a reference signal subset of the set of reference signals that correspond to the subset of the set of synchronization signal blocks, and communicating a data transmission with the base station using a first beam selected based on measuring a second signal metric for each reference signal in the reference signal subset.

An apparatus for wireless communications by a UE is described. The apparatus may include a processor, memory coupled with the processor, and instructions stored in the memory. The instructions may be executable by the processor to cause the apparatus to receive, from a base station, control signaling that configures the UE to monitor a set of synchronization signal blocks and a set of reference signals, select a subset of the set of synchronization signal blocks based on measuring a first signal metric for each synchronization signal block of the set of synchronization signal blocks, select a reference signal subset of the set of reference signals that correspond to the subset of the set of synchronization signal blocks, and communicate a data transmission with the base station using a first beam selected based on measuring a second signal metric for each reference signal in the reference signal subset.

Another apparatus for wireless communications by a UE is described. The apparatus may include means for receiving, from a base station, control signaling that configures the UE to monitor a set of synchronization signal blocks and a set of reference signals, selecting a subset of the set of synchronization signal blocks based on measuring a first signal metric for each synchronization signal block of the set of synchronization signal blocks, selecting a reference signal subset of the set of reference signals that correspond to the subset of the set of synchronization signal blocks, and communicating a data transmission with the base station using a first beam selected based on measuring a second signal metric for each reference signal in the reference signal subset.

A non-transitory computer-readable medium storing code for wireless communications by a UE is described. The code may include instructions executable by a processor to receive, from a base station, control signaling that configures the UE to monitor a set of synchronization signal blocks and a set of reference signals, select a subset of the set of synchronization signal blocks based on measuring a first signal metric for each synchronization signal block of the set of synchronization signal blocks, select a reference signal subset of the set of reference signals that correspond to the subset of the set of synchronization signal blocks, and communicate a data transmission with the base station using a first beam selected based on measuring a second signal metric for each reference signal in the reference signal subset.

Some examples of the method, apparatuses, and non-transitory computer-readable medium described herein may further include operations, features, means, or instructions for transmitting a measurement report indicating the reference signal subset and at least one corresponding second signal metric, and receiving a beam command instructing the UE to use the first beam for communication with the base station based on the measurement report.

In some examples of the method, apparatuses, and non-transitory computer-readable medium described herein, receiving the control signaling may include operations, features, means, or instructions for receiving the control signaling that configures the UE to monitor the set of synchronization signal blocks corresponding to a first set of beams having a first beam width and the set of reference signals corresponding to a second set of beams having a second beam width that may be narrower than the first beam width.

Some examples of the method, apparatuses, and non-transitory computer-readable medium described herein may further include operations, features, means, or instructions for receiving a message that indicates a quasi co-location relationship between each beam of the second set of beams and a respective beam of the first set of beams.

In some examples of the method, apparatuses, and non-transitory computer-readable medium described herein, selecting the subset of the set of synchronization signal blocks may include operations, features, means, or instructions for selecting the subset of the set of synchronization signal blocks that corresponds to a subset of the first set of beams.

In some examples of the method, apparatuses, and non-transitory computer-readable medium described herein, selecting the reference signal subset may include operations, features, means, or instructions for selecting the reference signal subset of the set of reference signals that corresponds to a subset of the second set of beams, where each beam of the subset of the second set of beams may have a quasi co-location relationship with a beam of the subset of the first set of beams.

In some examples of the method, apparatuses, and non-transitory computer-readable medium described herein, selecting the subset of the set of synchronization signal blocks may include operations, features, means, or instructions for selecting a first subset of the set of synchronization signal blocks on a first component carrier and a second subset of the set of synchronization signal blocks on a second component carrier.

In some examples of the method, apparatuses, and non-transitory computer-readable medium described herein, selecting the subset of the set of synchronization signal blocks may include operations, features, means, or instructions for selecting the subset of the set of synchronization signal blocks across one or more component carriers.

Some examples of the method, apparatuses, and non-transitory computer-readable medium described herein may further include operations, features, means, or instructions for selecting a second subset of the set of synchronization signal blocks based on generating an updated measurement of the first signal metric for each synchronization signal block of the set of synchronization signal blocks, selecting a second reference signal subset of the set of reference signals that correspond to the second subset of the set of synchronization signal blocks, and communicating a second data transmission with the base station using a second beam selected based on generating an updated measurement of the second signal metric for each reference signal in the second reference signal subset.

In some examples of the method, apparatuses, and non-transitory computer-readable medium described herein, the first beam may be different than the second beam.

In some examples of the method, apparatuses, and non-transitory computer-readable medium described herein, the first signal metric may be a reference signal receive power (RSRP) metric, a signal to interference plus noise (SINR) ratio, a signal to noise (SNR) ratio, a channel statistic, a second order channel statistic, or any combination thereof.

In some examples of the method, apparatuses, and non-transitory computer-readable medium described herein, the second signal metric may be a reference signal receive power (RSRP) metric, a signal to interference plus noise (SINR) ratio, a signal to noise (SNR) ratio, a channel statistic, a second order channel statistic, or any combination thereof.

In some examples of the method, apparatuses, and non-transitory computer-readable medium described herein, the set of reference signals may be channel state information reference signals.

A method of wireless communications by a base station is described. The method may include transmitting control signaling that configures a UE to monitor a set of synchronization signal blocks and a set of reference signals, the set of synchronization signal blocks corresponding to a first set of beams having a first beam width and the set of reference signals corresponding to a second set of beams having a second beam width that is narrower than the first beam width, transmitting a set of synchronization signals within the set of synchronization signal blocks and the set of reference signals, receiving a measurement report indicating a reference signal subset of the set of reference signals and at least one corresponding signal metric, transmitting a beam command instructing the UE to use a first beam of the second set of beams for communication with the base station based on the measurement report, and communicating a data transmission with the UE using the first beam.

An apparatus for wireless communications by a base station is described. The apparatus may include a processor, memory coupled with the processor, and instructions stored in the memory. The instructions may be executable by the processor to cause the apparatus to transmit control signaling that configures a UE to monitor a set of synchronization signal blocks and a set of reference signals, the set of synchronization signal blocks corresponding to a first set of beams having a first beam width and the set of reference signals corresponding to a second set of beams having a second beam width that is narrower than the first beam width, transmit a set of synchronization signals within the set of synchronization signal blocks and the set of reference signals, receive a measurement report indicating a reference signal subset of the set of reference signals and at least one corresponding signal metric, transmit a beam command instructing the UE to use a first beam of the second set of beams for communication with the base station based on the measurement report, and communicate a data transmission with the UE using the first beam.

Another apparatus for wireless communications by a base station is described. The apparatus may include means for transmitting control signaling that configures a UE to monitor a set of synchronization signal blocks and a set of reference signals, the set of synchronization signal blocks corresponding to a first set of beams having a first beam width and the set of reference signals corresponding to a second set of beams having a second beam width that is narrower than the first beam width, transmitting a set of synchronization signals within the set of synchronization signal blocks and the set of reference signals, receiving a measurement report indicating a reference signal subset of the set of reference signals and at least one corresponding signal metric, transmitting a beam command instructing the UE to use a first beam of the second set of beams for communication with the base station based on the measurement report, and communicating a data transmission with the UE using the first beam.

A non-transitory computer-readable medium storing code for wireless communications by a base station is described. The code may include instructions executable by a processor to transmit control signaling that configures a UE to monitor a set of synchronization signal blocks and a set of reference signals, the set of synchronization signal blocks corresponding to a first set of beams having a first beam width and the set of reference signals corresponding to a second set of beams having a second beam width that is narrower than the first beam width, transmit a set of synchronization signals within the set of synchronization signal blocks and the set of reference signals, receive a measurement report indicating a reference signal subset of the set of reference signals and at least one corresponding signal metric, transmit a beam command instructing the UE to use a first beam of the second set of beams for communication with the base station based on the measurement report, and communicate a data transmission with the UE using the first beam.

Some examples of the method, apparatuses, and non-transitory computer-readable medium described herein may further include operations, features, means, or instructions for transmitting a message that indicates a quasi co-location relationship between each beam of the second set of beams and a respective beam of the first set of beams.

Some examples of the method, apparatuses, and non-transitory computer-readable medium described herein may further include operations, features, means, or instructions for transmitting a second set of synchronization signals within the set of synchronization signal blocks and a second set of reference signals, receiving a measurement report indicating a second reference signal subset of the set of reference signals and at least one corresponding signal metric, transmitting a beam command instructing the UE to use a second beam of the second set of beams for communication with the base station based on the measurement report, and communicating a second data transmission with the UE using the second beam.

In some examples of the method, apparatuses, and non-transitory computer-readable medium described herein, the first beam may be different than the second beam.

In some examples of the method, apparatuses, and non-transitory computer-readable medium described herein, the first signal metric may be a reference signal receive power (RSRP) metric, a signal to interference plus noise (SINR) ratio, a signal to noise (SNR) ratio, a channel statistic, a second order channel statistic, or any combination thereof.

In some examples of the method, apparatuses, and non-transitory computer-readable medium described herein, the second signal metric may be a reference signal receive power (RSRP) metric, a signal to interference plus noise (SINR) ratio, a signal to noise (SNR) ratio, a channel statistic, a second order channel statistic, or any combination thereof.

In some examples of the method, apparatuses, and non-transitory computer-readable medium described herein, the set of reference signals may be channel state information reference signals.

DETAILED DESCRIPTION

Figure 1:
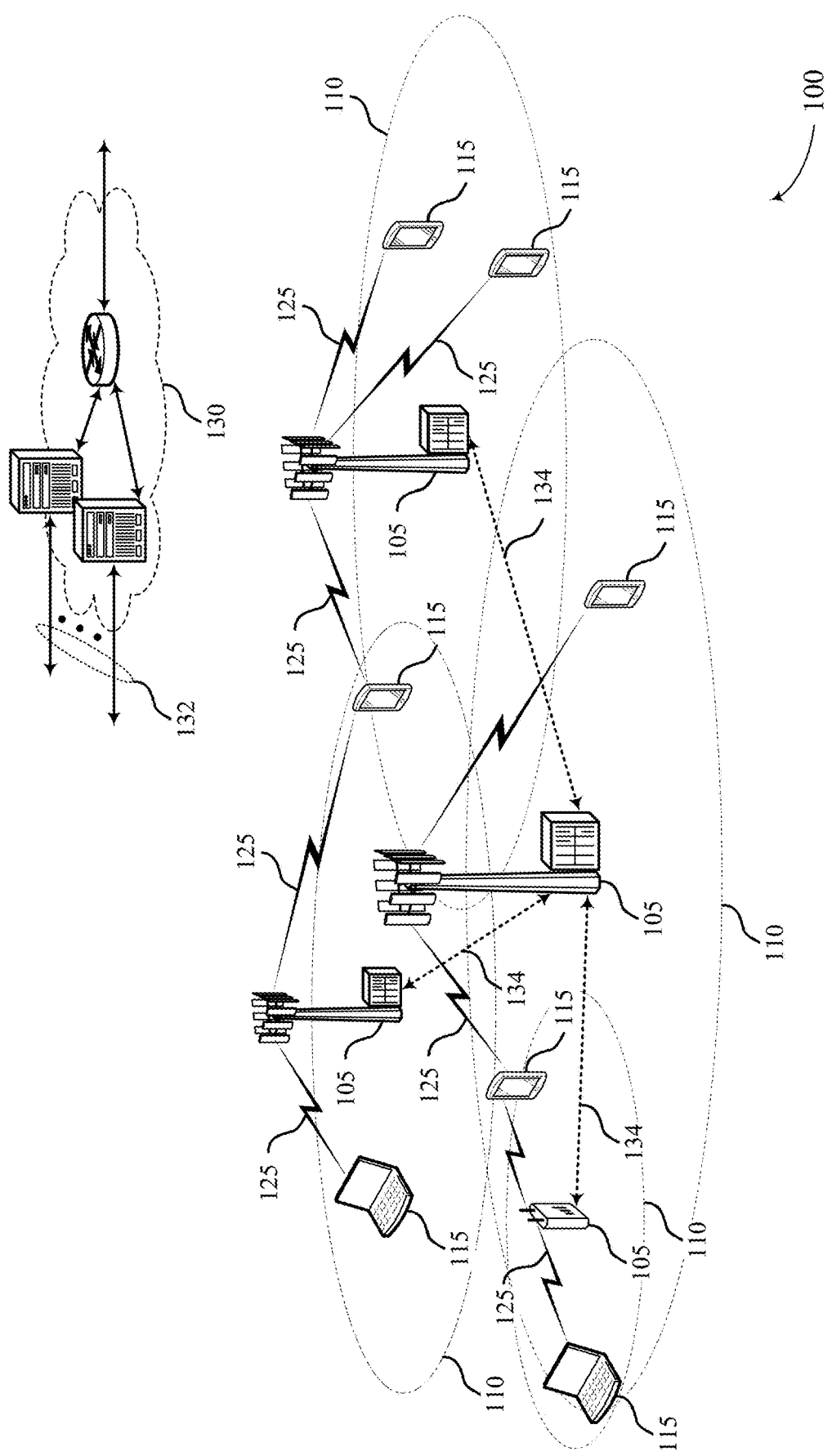
FIG. 1 illustrates an example of a system for wireless communications that supports hierarchical beam search in accordance with aspects of the present disclosure.

Some example wireless communications systems, for example, multiple-access systems (e.g., 5G-NR), may enable beam management techniques such as synchronization signal block (SSB) and channel state information reference signal (CSI-RS) based beam management. For example, a UE may perform a P1 procedure (e.g., SSB based beam measurement) to perform SSB measurements (e.g., SSB signal metrics such as reference signal receive power (RSRP)) to select a subset of wide beams for communication with a base station. During the P1 procedure, the base station may perform a beam sweep using a set of one or more wide beams, and the UE may report to the base station which of the wide beams have the highest signal quality (e.g., RSRP) and/or a beam index identifying each beam in the subset. In some examples, the UE may perform a P2 procedure (e.g., CSI-RS based beam measurement) to select a subset of narrow beams for communication with the base station, based on CSI-RS measurements. During the P2 procedure, the base station may perform a beam sweep using a set of one or more narrow beams, and the UE may report to the base station which of the beams have the highest signal quality (e.g., RSRP, SNR, SINR).

Depending on an infra configuration, however, a UE may be configured with a large number of CSI-RSs (e.g., narrow beams) to monitor in the P2 procedure. For example, the UE may be configured to monitor or track a relatively large number of CSI-RS beams (e.g., one hundred and thirty-six (136) narrow beams) during the P2 procedure, as compared to monitoring a relatively small number of wide beams (e.g., twelve (12) wide beams) during the P1 procedure. Tracking a large number of CSI-RS beams may be resource intensive and may lead to high computation power and memory usage, which may negatively impact UE performance.

In some example systems, however, up to all CSI-RSs for beam management may have a corresponding SSB QCL source, and a common receive (RX) filter may be used to receive both SSB and QCLed CSI-RSs. Example aspects described herein propose to adaptatively track or monitor CSI-RS beams associated with a desirable SSB RSRP level (e.g., an SSB RSRP level above a threshold). Accordingly, example aspects may utilize SSBs as a main reference signal (RS) for a tracking loop or similar, and a corresponding tracking reference signal (TRS), such as a CSI-RS, is used as an opportunity for tracking a subset of available narrow beams that correspond to a wide beam that has a satisfactory signal metric (e.g., track narrow beams associated with a SSB having a RSRP that satisfies a threshold).

Aspects of the disclosure are initially described in the context of a wireless communications system. Examples of beam management procedures, process flows, and a flow diagram are provided to describe aspects of the disclosure. Aspects of the disclosure are further illustrated by and described with reference to apparatus diagrams, system diagrams, and flowcharts that relate to adaptive narrow beam (e.g., CSI-RS beam) sub-selection based on wide beam (e.g., SSB beam) selection.

FIG. 1 illustrates an example of a wireless communications system 100 that supports hierarchical beam search in accordance with aspects of the present disclosure. Aspects of the wireless communications system 1100, for example, may support adaptive CSI-RS beam sub-selection based on SSB beam selection. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to examples of aspects described herein, a multiple-access system may provide for various types of beam management supportive of communications between transmitting and receiving devices. A receiving device (e.g., UE) may use a combination of SSB based beam management and reference signal based beam management to select beams for data transmissions with a base station. The UE may identify a first set of beams (e.g., a set of wide beams) based on SSB signal metrics (e.g., reference signal receive power (RSRP)), and may monitor a subset of a second set of beams (e.g., a set of narrow beams) based on quasi co-location (QCL) relationships between the second set of beams and the first set of beams. Accordingly, computational complexity may be reduced, as the UE may selectively track or monitor narrow beams based on whether the narrow beams have a QCL relationship with a wide beam having a relatively high RSRP.

Aspects of the techniques described herein may improve computational complexity by limiting which narrow beams are tracked (e.g., by tracking a subset of configured narrow beams). Additionally, a UE implementing examples of the aspects described herein may maintain a throughput performance similar to that of UEs that track all configured narrow beams.

Particular aspects of the subject matter described herein may be implemented to realize one or more advantages. The described methods, systems, devices, and apparatuses provide techniques which may support hierarchical beam search, such as adaptive narrow beam sub-selection based on wide beam sub selection (e.g., CSI-RS beam sub-selection based on SSB beam selection). As such, supported techniques may include features for a UE to avoid, reduce, or minimize unnecessary CSI-RS RSRP computation, which may achieve significant reductions in power usage and processing cycles. Additionally, the improved techniques provide for increased beam stability, which may ensure a stable beam on which loops are being tracked (e.g., CSI-RS based RSRP is typically or always biased with down selected SSBs).

Figure 2A:
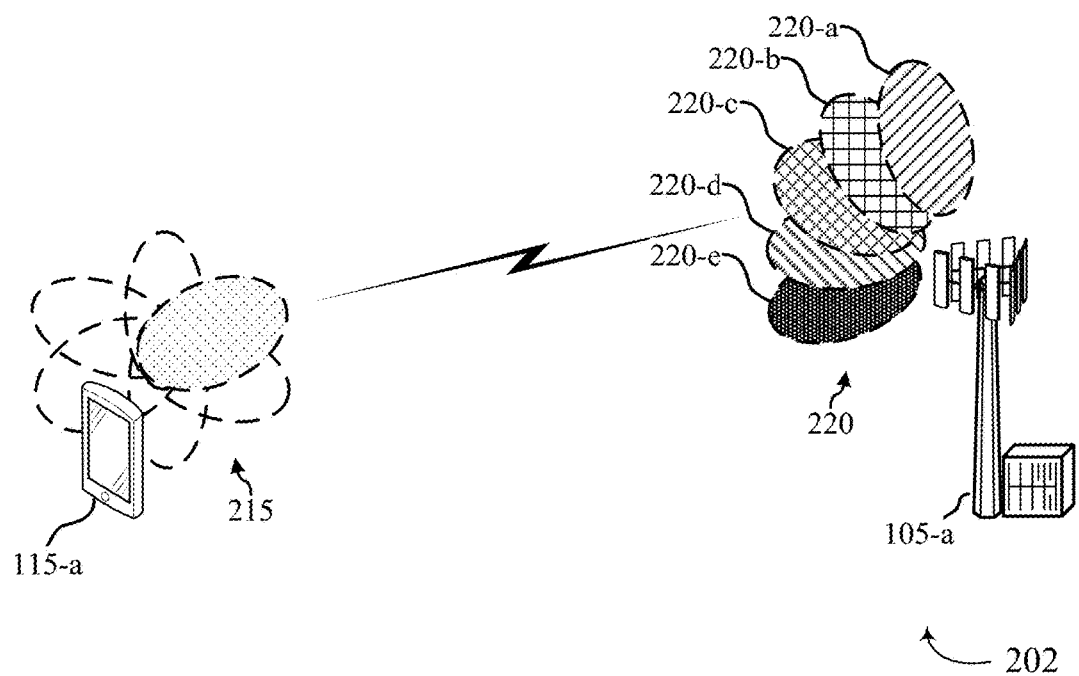
FIGS. 2A-2B illustrate examples of beam management procedures in accordance with aspects of the present disclosure.
Figure 2B:
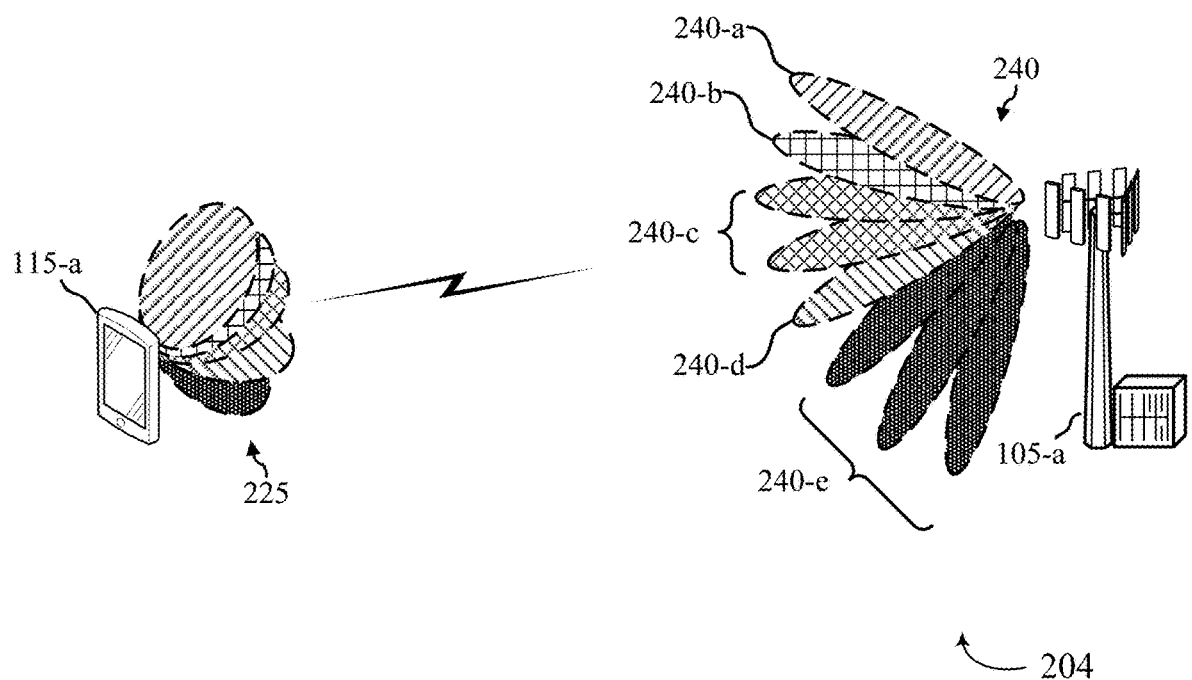

FIGS. 2A-2B illustrates examples of beam management procedures in some systems. In some examples, beam management procedures 202 and 204 may implement aspects of wireless communication system 100. Beam management procedures 202 and 204 may include UE 115-*a* and a base station 105-*a*. UE 115-*a* and base station 105-*a* may be examples of UE 115 and base station 105 described herein with reference to FIG. 1, respectively. According to aspects described herein, beam management procedures 202 and 204 may be procedures for downlink beam management (e.g., from base station 105-*a* to UE 115-*a*).

Referring to the example beam management procedure 202 illustrated in FIG. 2A, UE 115-*a* may perform a wide beam selection procedure. For example, UE 115-*a* may perform a P1 Procedure (e.g., wide transmission (TX) beam selection), in which UE 115-*a* may use a codebook (e.g., a predefined codebook) to cover a wide angular space or range via one or more beams 215 (e.g., a set of beams pointed in different directions that cover up to 360 degrees around UE 115-*a*) to receive various data or control signals. UE 115-*a*, for example, may use the codebook to cover a wide angular space or range to receive different signals (e.g., SSBs). In an example, base station 105-*a* may perform a beam sweep using a set of one or more of wide beams 220 (e.g., wide TX beams 220, also referred to herein, for example, as SSB beams 220), and UE 115-*a* may report to base station 105-*a* which of the wide beams 220 have the highest signal quality (e.g., RSRP, signal to noise ratio (SNR), signal to interference plus noise ratio (SINR)) and/or a beam index identifying each beam in the subset.

UE 115-*a* may perform the P1 procedure, for example, in response to a request from a base station 105-*a* or as a background search. In an example, UE 115-*a* may perform a P1 procedure in response to receiving a layer one (L1) reporting request (e.g., L1-RSRP request) from base station 105-*a*. According to examples of aspects described herein, UE 115-*a* may report back a subset of SSB beams 220 (e.g., the top N SSB beams 220, for example, SSB beams 220-*c* through 220-*e*, where N<4) along with their associated L1-RSRP values (e.g., if scheduled). In reporting a subset of SSB beams 220, for example, UE 115-*a* may determine the top N SSB beams 220 (e.g., SSB beams 220-*c* through 220-*e*) based on one or more signal characteristics (e.g., the top N SSB beams 220 having the highest L1-RSRP values) and report the top N SSB beams 220 (e.g., SSB beams 220-*c* through 220-*e*) to base station 105-*a*.

Referring to the example beam management procedure 204 illustrated in FIG. 2B, UE 115-*a* may perform a narrow beam refinement procedure. For example, during a P2 procedure (e.g., narrow TX beam refinement), UE 115-*a* may be scheduled with CSI-RS on different narrow TX beams 240 (also referred to herein, for example, as narrow beams 240 and CSI-RS beams 240), each covering a smaller angular range compared to SSBs. UE 115-*a* may use the CSI-RS values to estimate channel information (e.g., channel quality) associated with each of the narrow TX beams 240 and report the information back to the base station 105-*a*. In an example, UE 115-*a* may use a beam (e.g., one or more beams 225) associated with a codebook to monitor a beam sweep performed by base station 105-*a*. Base station 105-*a* may perform a beam sweep using a set of one or more of narrow beams 240, and UE 115-*a* may report to base station 105-*a* which of the narrow beams 240 have the highest signal quality (e.g., RSRP, SNR, SINR). Narrow beams 240 used during the P2 procedure may be narrower (e.g., cover a smaller angular range) than wide beams 220 (e.g., wide TX beams 220, SSB beams 220) used during the P1 procedure, and the beam sweep performed by base station 105-*a* during the P2 procedure may be narrower in range than the beam sweep performed by base station 105-*a* during the P1 procedure.

According to examples of aspects described herein, UE 115-*a* may report back a subset of CSI-RS beams 240 (e.g., the top N CSI-RS beams 240, for example, CSI-RS beams 240-*b* through 240-*e*, where N<4) along with their associated L1-RSRP values and/or a beam index identifying each beam in the subset. In reporting a subset of CSI-RS beams 225, UE 115-*a* may determine the top N CSI-RS beams 240 based on one or more signal characteristics (e.g., the top N CSI-RS beams 240, for example, CSI-RS beams 240-*b* and 240-*e*, having the highest L1-RSRP values).

Figure 3:
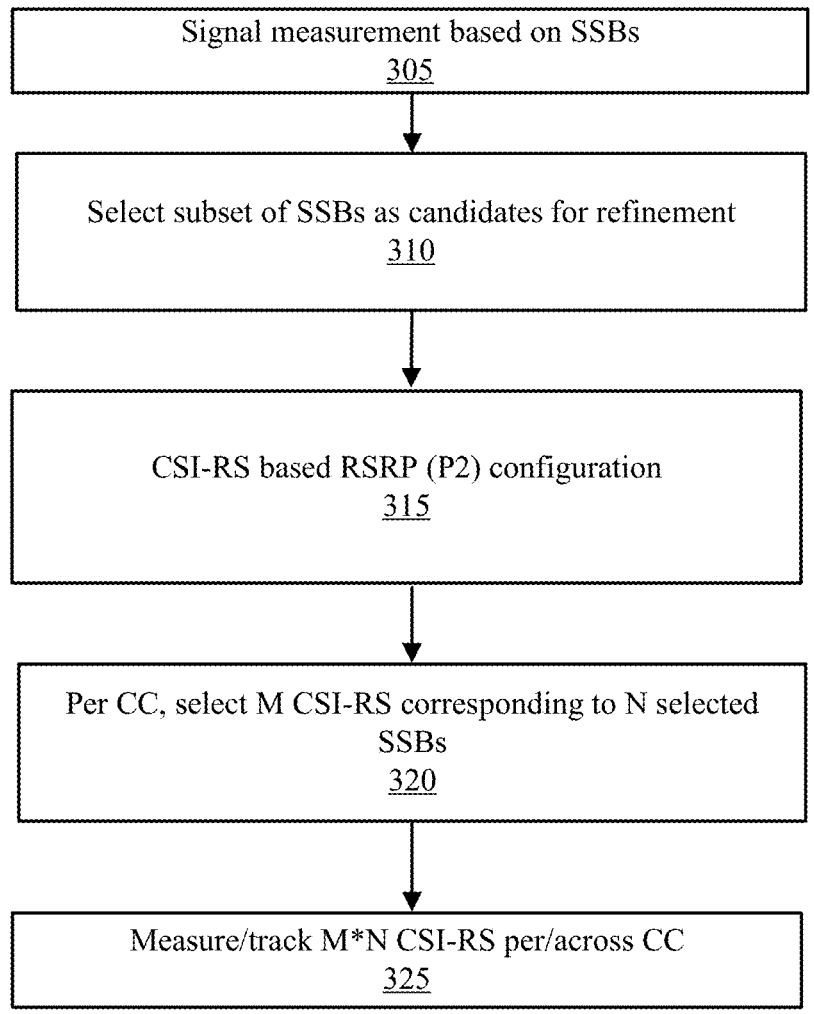
FIG. 3 illustrates an example of a flow diagram that supports hierarchical beam search in accordance with aspects of the present disclosure.

FIG. 3 illustrates an example of a flow diagram 300 that supports hierarchical beam search in accordance with aspects of the present disclosure. In some examples, flow diagram 300 may implement aspects of wireless communication system 100. Flow diagram 300 may be implemented at a UE 115 or UE 115-*a* and a base station 105 or base station 105-*a* as described with reference to FIGS. 1 and 2.

At 305, UE 115 may make signal measurements (e.g., RSRP measurements) based on SSBs. For example, UE 115 may collect beam statistics based on SSB measurements. In an example, UE 115 may receive, from base station 105, control signaling that may configure the UE 115 to monitor a set of SSBs. Additionally, the control signaling may configure the UE 115 to monitor a set of reference signals (e.g., CSI-RSs).

According to examples of aspects described herein, the control signaling may configure the UE 115 to monitor SSBs corresponding to a first set of beams having a first beam width (e.g., wide beams) and reference signals (e.g., CSI-RSs) corresponding to a second set of beams having a second beam width (e.g., narrow beams), where the second beam width may be narrower than the first beam width. For example, UE 115 may receive control signaling which may configure UE 115 to monitor SSBs corresponding to a set of wide beams 220 (e.g., wide TX beams 220, SSB beams 220) associated with a beam sweep performed by base station 105. In some examples, UE 115 may measure a first signal metric (e.g., RSRP, SINR, SNR) for each of the SSBs. The control signaling may configure the UE 115 to monitor reference signals (e.g., CSI-RSs) corresponding to a set of narrow beams 240 (e.g., narrow TX beams 240, CSI-RS beams 240) associated with a beam sweep performed by base station 105.

Additionally, in some examples, UE 115 may receive a message (e.g., control message or signaling) that may indicate QCL relationships between beams of the second set of beams (e.g., narrow beams) and respective beams of the first set of beams (e.g., wide beams). For example, UE 115 may receive a message (e.g., control message or signaling) that may indicate QCL relationships between the wide beams 220 (e.g., wide TX beams 220, SSB beams 220) and narrow beams 240 (e.g., narrow TX beams 240, CSI-RS beams 240) transmitted by base station 105.

Control signaling, as provided in the examples described herein, may inform a UE (e.g., UE 115) which set of reference signals, including but not limited to CSI-RS resources, DM-RS, and CRS, may be assumed as quasi co-located by the UE with a respective SSB resource. For example, beams sharing a QCL relationship may share similar properties in terms of parameters such as Doppler shift, Doppler spread, average delay, delay spread, and spatial Rx parameters.

At 310, UE 115 may select a subset of SSBs 220 corresponding to a subset of the wide beams (e.g., wide TX beams 220, SSB beams 220) transmitted by base station 105 as part of the beam sweep as candidates for beam refinement. For example, UE 115 may select a subset of SSB beams 220 (e.g., N SSB beams 220, for example, SSB beams 220-*c* through 220-*e*, where N<4) based on the first signal metric associated with each SSB, as measured at 305. In an example, UE 115 may select the top N SSBs (e.g., N SSBs having the highest first signal metric values among SSBs, where N<4, for example) as candidates for refinement, where the top N SSBs correspond to a subset of SSB beams 220 (e.g., SSB beams 220-*c* through 220-*e*). As described herein, the first signal metric may include, for example, RSRP, SINR, or SNR. In some examples, UE 115 may select the top N SSBs (e.g., top N SSB beams 220, for example, SSB beams 220-*c* through 220-*e*) based on associated RSRP strength or antenna orientation.

According to examples of aspects described herein, UE 115 may select a subset of SSBs (e.g., the top N SSBs) per component carrier (CC), or across multiple CCs (e.g., based on the scenario). For example, in the Sub-6 GHz spectrum, UE 115 may select a subset of SSBs (e.g., the top N SSBs) per CC. In another example, while in frequency range 2 (FR2) intra carrier aggregation (CA), UE 115 may select a subset of SSBs (e.g., the top N SSBs) across multiple CCs.

At 315, UE 115 may determine to perform a P2 procedure (e.g., TX beam refinement) based on control signaling provided by base station 105. For example, UE 115 may determine to perform CSI-RS based RSRP (e.g., P2 procedure) based on control signaling that UE 115 receives from base station 105. In an example, the control signaling may indicate CSI-RSs that the UE 115 may utilize for beam refinement (e.g., P2 procedure).

The control signaling may include radio resource control (RRC) signaling (e.g., RRC messaging). In an example, UE 115 may receive RRC messages from base station 105 informing UE 115 of CSI-RSs that UE 115 may use for beam refinement. Alternatively or additionally, UE may use CSI-RSs not associated with beam management (e.g., not indicated for beam management) for beam refinement.

At 320, UE 115 may select a subset of reference signals (e.g., CSI-RSs) for monitoring that correspond to the subset of the SSBs selected at 310. In an example, per CC, UE 115 may select M CSI-RSs (e.g., where M is an integer) corresponding to the N SSBs selected at 310 as candidates for refinement. For example, UE 115 may determine a subset (e.g., CSI-RS beams 240-*c* through 240-*e*) of narrow beams 240 (e.g., CSI-RS beams 240) having QCL relationships with a subset (e.g., the top N SSB beams 220, for example, SSB beams 220-*c* through 220-*e*) of wide beams 220 (e.g., SSB beams 220) that correspond to the N SSBs. Accordingly, UE 115 may determine a corresponding subset of reference signals (e.g., CSI-RSs) from the subset of narrow beams 240. In some examples, UE 115 may receive a control message or signaling conveying the QCL relationships.

In an example, for each of the N SSBs selected as candidates for refinement at 310 (e.g., for having the highest first signal metric values among SSBs), UE 115 may select M reference signals (e.g., where M is an integer) based on a QCL relationship between beams corresponding to the N SSBs (e.g., a subset of SSB beams 220) and beams corresponding to the M reference signals (e.g., a subset of CSI-RS beams 240).

For example, referring to FIGS. 2A and 2B, CSI-RS beams 240-*a* through 240-*e* may have respective QCL relationships with SSB beams 220-*a* through 220-*e*. In an example, CSI-RS beam 240-*a* may have a QCL relationship with SSB beam 220-*a*, CSI-RS beam 240-*b* may have a QCL relationship with SSB beam 220-*b*, CSI-RS beams 240-*c* may have a QCL relationship with SSB beam 220-*c*, CSI-RS beam 240-*d* may have a QCL relationship with SSB beam 220-*d*, and CSI-RS beams 240-*e* may have a QCL relationship with SSB beam 220-*e*.

In determining M reference signals (e.g., CSI-RSs), UE 115 may determine a subset of CSI-RS beams 240, referring to QCL relationships between CSI-RS beams 240 and SSB beams 220. For example, UE 115 may determine which of the CSI-RS beams 240 have a QCL relationship with the top N SSB beams 220 (e.g., SSB beams 220-*c* through 220-*e*). For example, UE 115 may determine that CSI-RS beams 240-*c* through 240-*e* respectively have QCL relationships with SSB beams 220-*c* through 220-*e*. Accordingly, based on the QCL relationships, UE 115 may determine a subset (e.g., CSI-RS beams 240-*c* through 240-*e*) of a second set of beams (e.g., CSI-RS beams 240), where each beam of the subset of the second set of beams has a QCL relationship with a beam of the subset (e.g., SSB beams 220-*c* through 220-*e*) of a first set of beams (e.g., SSB beams 220).

According to examples of aspects described herein, based on 305 through 320, UE 115 may identify and select for monitoring, reference signals (e.g., CSI-RSs) which have a QCL relationship with strongest SSBs. For example, as described herein with respect to 305 through 320, UE 115 may monitor a subset of SSBs (e.g., top N SSBs) that are strongest according to the first signal metric (e.g., RSRP, SINR, or SNR), and for each of the SSBs in the subset, monitor a subset of reference signals (e.g., CSI-RSs) determined according to QCL relationships between a first set of beams corresponding to the subset of SSBs (e.g., SSB beams 220-*c* through 220-*e*) and a second set of beams corresponding to the subset of reference signals (e.g., CSI-RS beams 240-*c* through 240-*e*).

At 325, UE 115 may measure or track M×N CSI-RSs per CC or across CCs. By measuring or tracking only a subset of reference signals (e.g., CSI-RSs having a QCL relationship with the strongest SSBs, for example, the top N SSBs), UE 115 may experience reduced processing overhead and memory usage.

In an example, for twelve (12) available wide beams (e.g., wide TX beams, SSB beams), each wide beam may have twelve (12) available narrow beams (e.g., narrow TX beams, CSI-RS beams), equaling a total of, for example, one hundred and forty-four (144) available narrow beams. In an example, from among the twelve (12) wide beams, UE 115 may identify four (4) wide beams (e.g., top four (4) having a highest signal metric, for example, RSRP) that are associated with twelve (12) narrow beams per wide beam, where each narrow beam selected for monitoring has a QCL relationship with one of the four (4) wide beams. Thus, for example, UE 115 may monitor a subset of the narrow beams associated with a subset of the wide beams having the highest signal metric among wide beams. According to aspects of the example, UE 115 may measure a total of forty-eight (48) narrow beams (as opposed to 144 narrow beams), and thus may save power, processing capabilities, and memory usage.

In some examples, in measuring or tracking the subset of reference signals (e.g., CSI-RSs), UE 115 may measure a second signal metric (e.g., RSRP, SINR, or SNR) for each reference signal in the reference signal subset. In some aspects, UE 115 may transmit a measurement report to base station 105 indicating the reference signal subset and at least one corresponding second signal metric. In an example, the measurement report may indicate which reference signals in the reference signal subset have a second signal metric above a threshold.

According to examples of aspects described herein, the determination of which reference signals (e.g., CSI-RSs) to measure or track may be updated over time. For example, UE 115 may determine the M×N CSI-RSs on a periodic basis or based on a trigger condition (e.g., updated measurements associated with the first signal metric for each of the SSBs). In an example, due to UE movement and/or changes to conditions of the wireless channel, UE 115 may change overtime which SSBs are being tracked, as well as corresponding CSI-RSs that are being tracked, per CC or across CCs, example aspects of which are described in FIG. 4.

Figure 4:
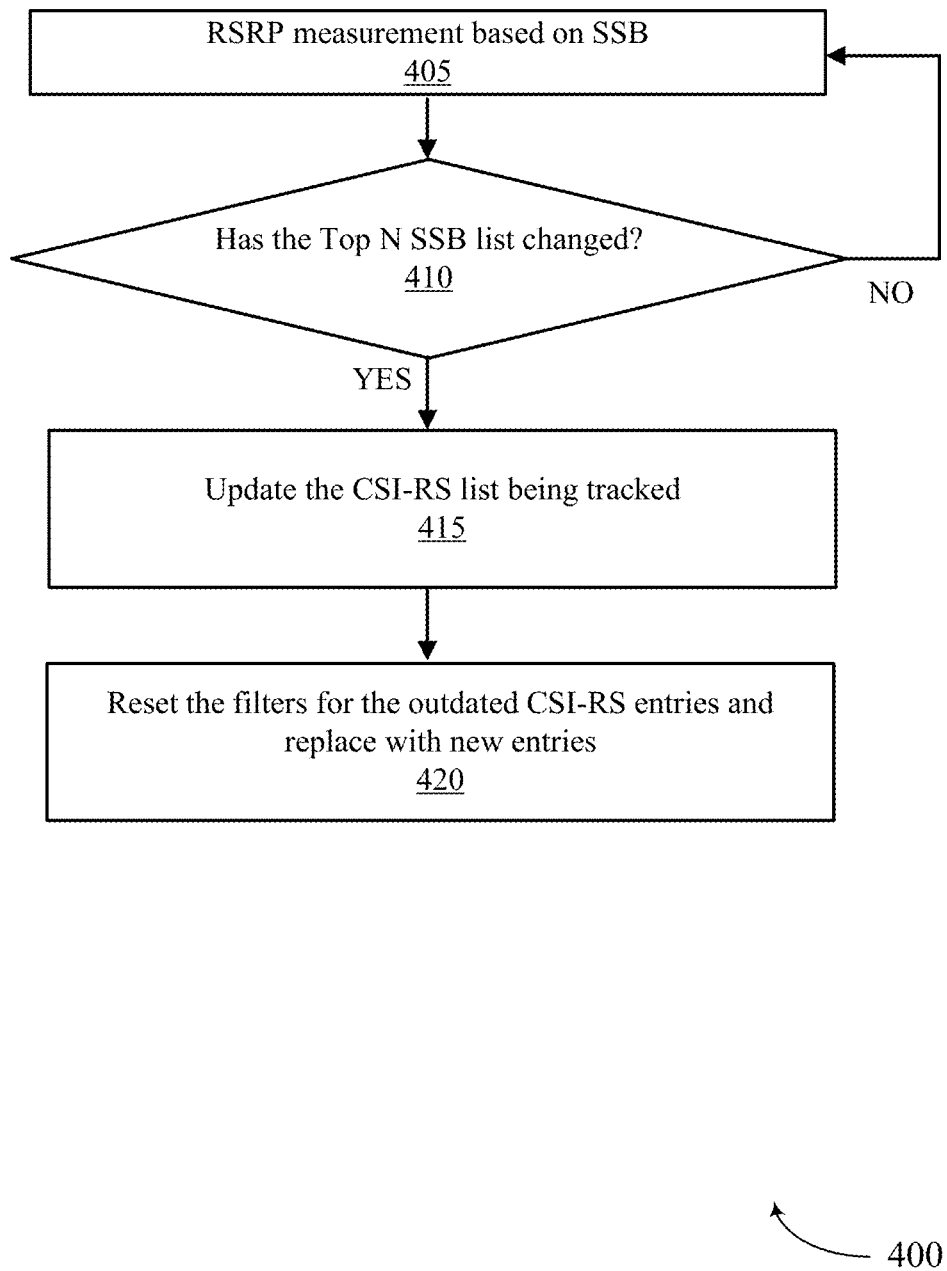
FIG. 4 illustrates an example of a flow diagram that supports hierarchical beam search in accordance with aspects of the present disclosure.

FIG. 4 illustrates an example of a flow diagram 400 that supports hierarchical beam search in accordance with aspects of the present disclosure. In some examples, flow diagram 400 may implement aspects of wireless communication system 100. Flow diagram 400 may be implemented at a UE 115 or UE 115-*a* and a base station 105 or base station 105-*a* as described with reference to FIGS. 1 and 2.

At 405, UE 115 may make signal measurements (e.g., RSRP measurements) based on SSBs. The signal measurements at 405 may update, for example, measurements of the first signal metric for each of the SSBs. Example aspects of 405 with respect to signal measurements are similar to the example aspects described with respect to 305 and are omitted herein for brevity. According to examples of aspects described herein, the updated measurements (e.g., SSB measurements) may result in a different top N SSB list, and accordingly, which CSI-RS beams UE 115 is monitoring may need to be updated.

For example, at 410, UE 115 may determine whether the top N SSB list determined at 310 has changed. In an example, UE 115 may select top N SSBs based on the signal measurements made at 405 (e.g., UE 115 may redetermine the N SSBs having the highest first signal metric values among SSBs, based on the updated measurements made at 405). In determining (e.g., redetermining) the top N SSBs, for example, UE 115 may incorporate example aspects as described herein with respect to 310 (e.g., selecting a subset of SSBs as candidates for beam refinement). Accordingly, at 410, UE 115 may determine whether the top N SSBs selected at 410 (e.g., second subset of SSBs, selected based on updated measurements) differ from the top N SSBs selected at 310 (e.g., first subset of SSBs). If UE 115 determines that that top N SSB list has changed (e.g., one or more of the top N SSBs selected at 410 differ from one or more of the top N SSBs selected at 310), then at 415, UE 115 may update the CSI-RS list being tracked.

In some examples, at 415, UE 115 may select a subset of reference signals (e.g., CSI-RSs) corresponding to the SSBs selected at 410 (e.g., UE 115 may update the CSI-RS list determined at 320). In selecting the subset of reference signals, for example, UE 115 may incorporate example aspects as described herein with respect to 320. In an example, UE 115 may change which reference signals (e.g., CSI-RSs) are being tracked in accordance with a change in the subset of the SSBs having, for example, the highest RSRP. For example, UE 115 may add CSI-RS states corresponding to SSBs newly selected at 410 (e.g., SSBs included in the top N SSBs selected at 410 but not included in the top N SSBs selected at 310). In some examples, UE 115 may ignore CSI-RS states corresponding to SSBs not included at 410 (e.g., SSBs included in the top N SSBs selected at 310 but not included in the top N SSBs selected at 410).

At 420, UE 115 may reset the filters (e.g., receive (RX) filters) for outdated CSI-RS entries and replace with new entries. For example, UE 115 may set RX filters based on the SSBs newly selected at 410 and the corresponding CSI-RSs selected at 415.

Figure 5:
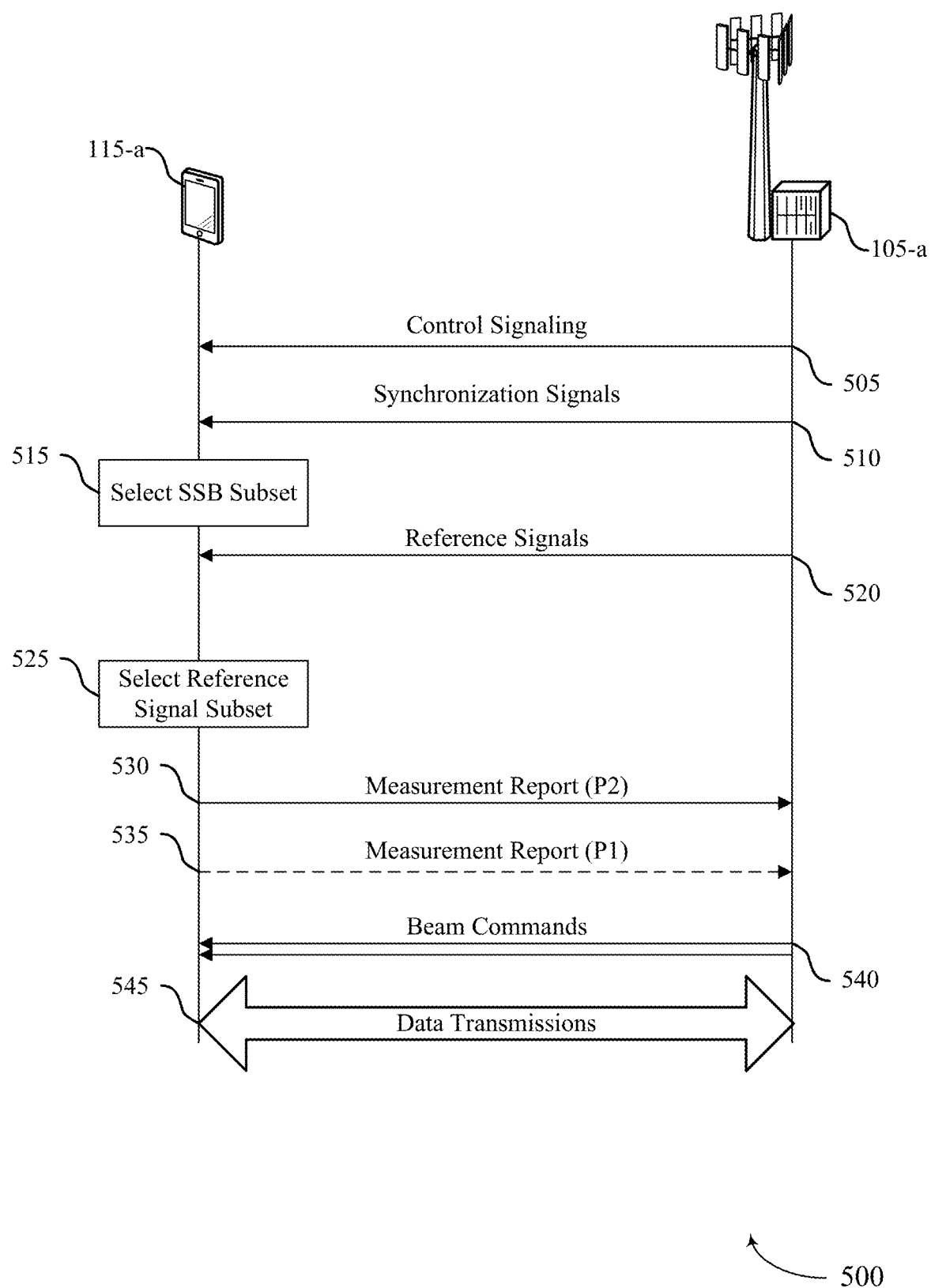
FIG. 5 illustrates an example of a process flow that supports hierarchical beam search in accordance with aspects of the present disclosure.

FIG. 5 illustrates an example of a process flow 500 that supports hierarchical beam search in accordance with aspects of the present disclosure. In some examples, process flow 500 may implement aspects of wireless communication system 100. Process flow 500 may be implemented at a UE 115 or UE 115-a and a base station 105 or base station 105-a as described with reference to FIGS. 1 and 2.

At 505, UE 115 may receive, from base station 105, control signaling that may configure the UE 115 to monitor a plurality of SSBs and a plurality of reference signals. The reference signals may include, for example, CSI-RSs. In some examples, the control signaling may configure the UE to monitor a plurality of SSBs corresponding to a first set of beams (e.g., wide beams, for example, SSB beams) having a first beam width and a plurality of reference signals corresponding to a second set of beams (e.g., narrow beams, for example, CSI-RS beams) having a second beam width that is narrower than the first beam width. In some examples, UE 115 may receive a message (e.g., an RRC message) that may indicate a QCL relationship between each beam of the second set of beams and a respective beam of the first set of beams.

At 510, UE 115 may receive, from base station 105, a plurality of synchronization signals transmitted within the plurality of SSBs.

At 515, UE 115 may select a subset of the plurality of SSBs based on measuring a first signal metric (e.g., an RSRP metric, a SINR, a SNR, a channel statistic, a second order channel statistic) for each SSB of the plurality of SSBs. In some examples, UE 115 may select the subset of the plurality of SSBs that corresponds to a subset of the first set of beams.

In some aspects, UE 115 may select the subset of the plurality of SSBs across one or more component carriers. For example, UE 115 may select a first subset of the plurality of SSBs on a first component carrier and a second subset of the plurality of SSBs on a second component carrier.

At 520, UE 115 may receive, from base station 105, a plurality of reference signals. In some examples, the reference signal may be channel state information reference signals.

At 525, UE 115 may select a reference signal subset of the plurality of reference signals that correspond to the subset of the plurality of SSBs. In some examples, UE 115 may select the reference signal subset of the plurality of reference signals that corresponds to a subset of the second set of beams, where each beam of the subset of the second set of beams has a QCL relationship with a beam of the subset of the first set of beams selected at 515.

At 530, UE 115 may transmit a measurement report indicating the reference signal subset and at least one corresponding second signal metric (e.g., an RSRP metric, a SINR, a SNR, a channel statistic, a second order channel statistic).

At 535, UE 115 may transmit a measurement report indicating the subset of the plurality of SSBs and at least one corresponding signal metric. Alternatively, UE 115 may omit transmitting this measurement report.

At 540, UE 115 may receive a beam command instructing UE 115 to use a first beam (e.g., a narrow beam, for example, a CSI-RS beam) for communication with the base station based on the measurement report. For example, based on the measurement report from 530, base station 105 may determine a narrow beam having a relatively high signal metric (e.g., RSRP) and transmit a beam command instructing UE 115 to use that narrow beam.

At 545, UE 115 may communicate a data transmission with the base station 105 using a first beam selected based on measuring a second signal metric for each reference signal in the reference signal subset.

According to examples of aspects described herein, UE 115 may select a second subset of the plurality of SSBs based on generating an updated measurement of the first signal metric for each SSB of the plurality of SSBs. UE 115 may select a second reference signal subset of the plurality of reference signals that correspond to the second subset of the plurality of SSBs. UE may communicate a second data transmission with the base station using a second beam selected based at least in part on generating an updated measurement of the second signal metric for each reference signal in the second reference signal subset.

According to examples of aspects described herein, UE 115 may receive, from base station 105, a second plurality of synchronization signals transmitted within the plurality of SSBs and a second plurality of reference signals. UE 115 may select a second reference signal subset of the plurality of reference signals that correspond to the second subset of the plurality of SSBs. In some examples, UE 115 may transmit a measurement report indicating a second reference signal subset of the plurality of reference signals and at least one corresponding signal metric (e.g., an RSRP metric, a SINR, a SNR, a channel statistic, a second order channel statistic). Accordingly, in some examples, UE 115 may receive a beam command instructing the UE to use a second beam of the second set of beams for communication with the base station 105 based on the measurement report. UE 115 may communicate a second data transmission with the UE using the second beam.

According to examples of aspects described herein, UE 115 may communicate a second data transmission with the base station 105 using a second beam selected based on generating an updated measurement of the second signal metric for each reference signal in the second reference signal subset.

Figure 6:
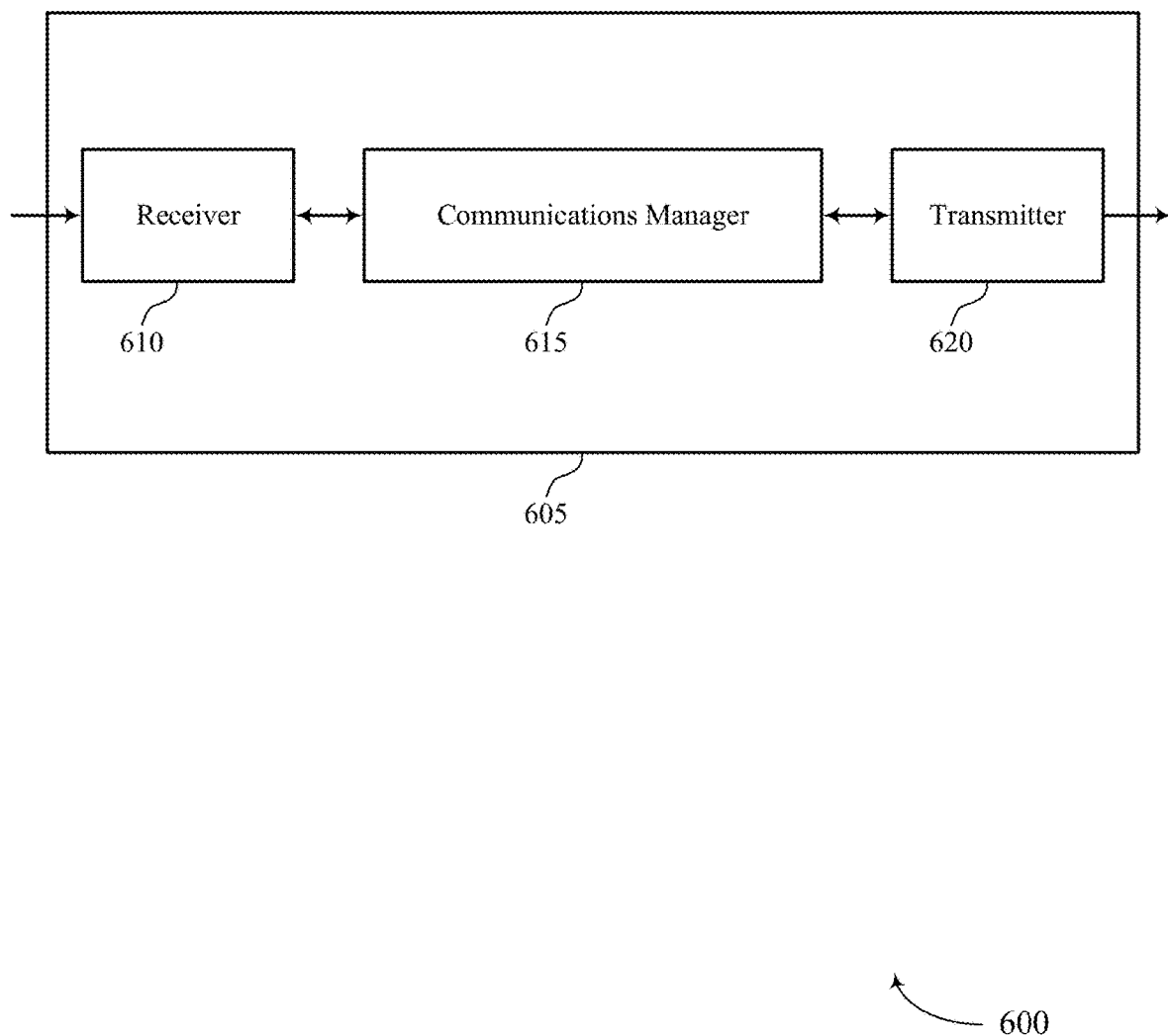
FIGS. 6 and 7 show block diagrams of devices that support hierarchical beam search in accordance with aspects of the present disclosure.

FIG. 6 shows a block diagram 600 of a device 605 that supports hierarchical beam search in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to adaptive CSI-RS beam sub-selection based on SSB beam selection, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, control signaling that configures the UE to monitor a set of SSBs and a set of reference signals, select a subset of the set of SSBs based on measuring a first signal metric for each SSB of the set of SSBs, select a reference signal subset of the set of reference signals that correspond to the subset of the set of SSBs, and communicate a data transmission with the base station using a first beam selected based on measuring a second signal metric for each reference signal in the reference signal subset. The communications manager 615 may be an example of aspects of the communications manager 910 described herein.

The communications manager 615 as described herein may be implemented to realize one or more potential advantages. One implementation may allow the device 605 to provide techniques which may support adaptive CSI-RS beam sub-selection based on SSB beam selection, among other advantages. For example, the device 605 may include features for reducing power usage and processing cycles, as the device 605 may communicate a data transmission with a base station based on signal metrics associated with reference signals in a reference signal subset.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
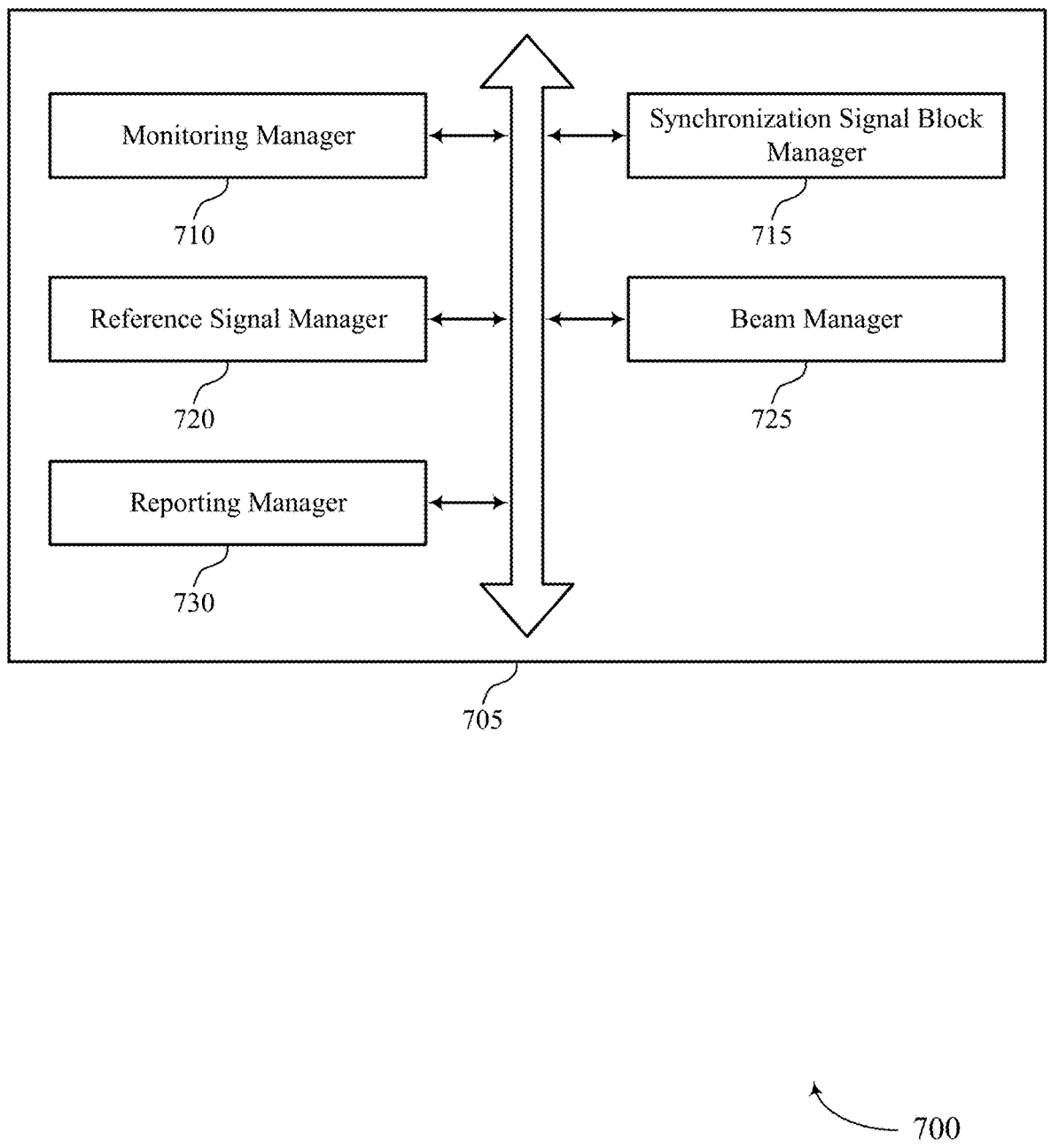

FIG. 7 shows a block diagram 700 of a device 705 that supports hierarchical beam search in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to adaptive CSI-RS beam sub-selection based on SSB beam selection, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring manager 720, a synchronization signal block manager 725, a reference signal manager 730, and a beam manager 735. The communications manager 715 may be an example of aspects of the communications manager 910 described herein.

The monitoring manager 720 may receive, from a base station, control signaling that configures the UE to monitor a set of SSBs and a set of reference signals.

The synchronization signal block manager 725 may select a subset of the set of SSBs based on measuring a first signal metric for each SSB of the set of SSBs.

The reference signal manager 730 may select a reference signal subset of the set of reference signals that correspond to the subset of the set of SSBs.

The beam manager 735 may communicate a data transmission with the base station using a first beam selected based on measuring a second signal metric for each reference signal in the reference signal subset.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
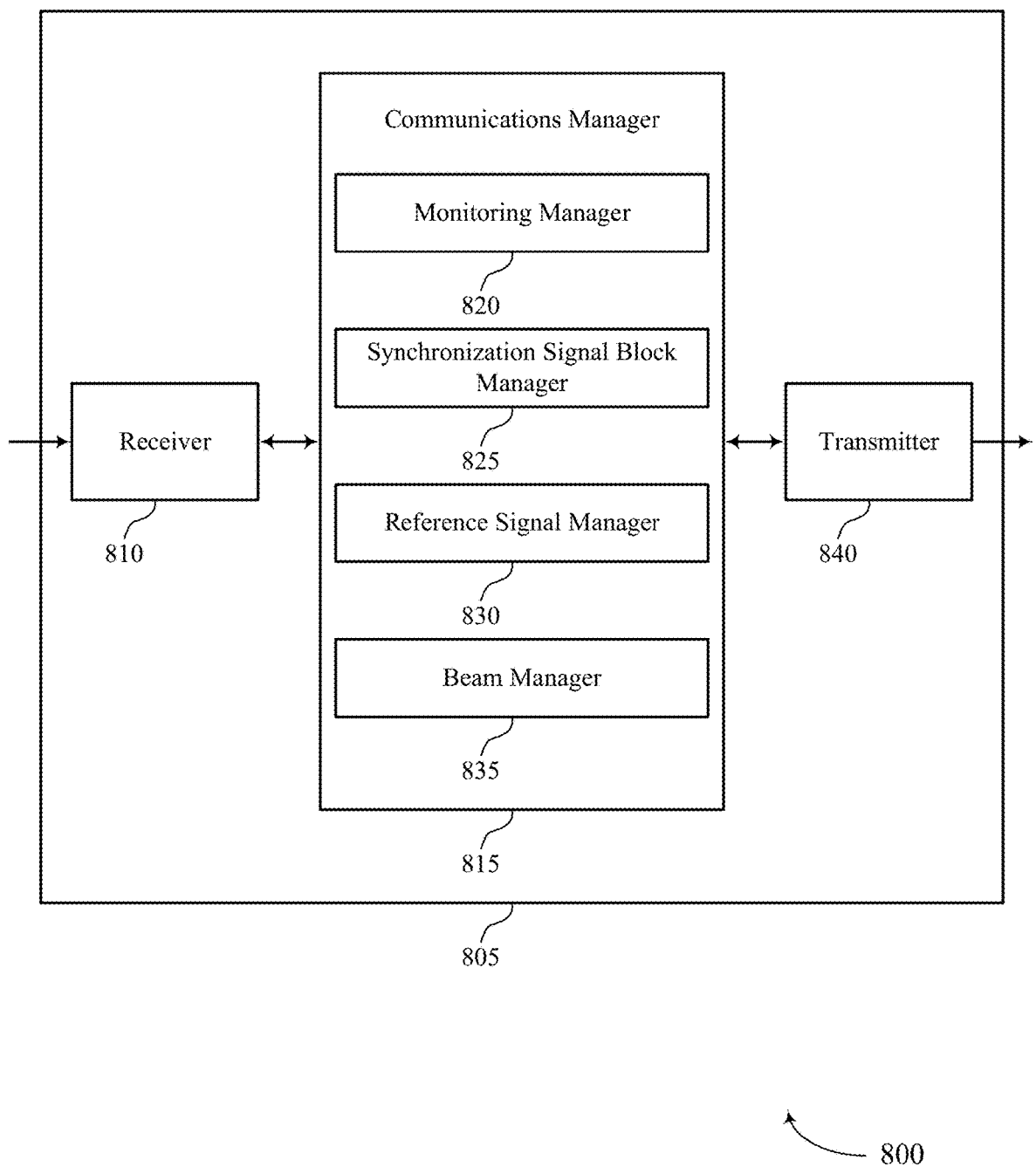
FIG. 8 shows a block diagram of a communications manager that supports hierarchical beam search in accordance with aspects of the present disclosure.

FIG. 8 shows a block diagram 800 of a communications manager 805 that supports hierarchical beam search in accordance with aspects of the present disclosure. The communications manager 805 may be an example of aspects of a communications manager 615, a communications manager 715, or a communications manager 910 described herein. The communications manager 805 may include a monitoring manager 810, a synchronization signal block manager 815, a reference signal manager 820, a beam manager 825, and a reporting manager 830. Each of these modules may communicate, directly or indirectly, with one another (e.g., via one or more buses).

The monitoring manager 810 may receive, from a base station, control signaling that configures the UE to monitor a set of SSBs and a set of reference signals.

In some examples, the monitoring manager 810 may receive the control signaling that configures the UE to monitor the set of SSBs corresponding to a first set of beams having a first beam width and the set of reference signals corresponding to a second set of beams having a second beam width that is narrower than the first beam width.

The synchronization signal block manager 815 may select a subset of the set of SSBs based on measuring a first signal metric for each SSB of the set of SSBs.

The reference signal manager 820 may select a reference signal subset of the set of reference signals that correspond to the subset of the set of SSBs.

The beam manager 825 may communicate a data transmission with the base station using a first beam selected based on measuring a second signal metric for each reference signal in the reference signal subset.

In some examples, the beam manager 825 may receive a beam command instructing the UE to use the first beam for communication with the base station based on the measurement report.

In some examples, the beam manager 825 may receive a message that indicates a QCL relationship between each beam of the second set of beams and a respective beam of the first set of beams.

The Reporting Manager 830 may transmit a measurement report indicating the reference signal subset and at least one corresponding second signal metric.

Figure 9:
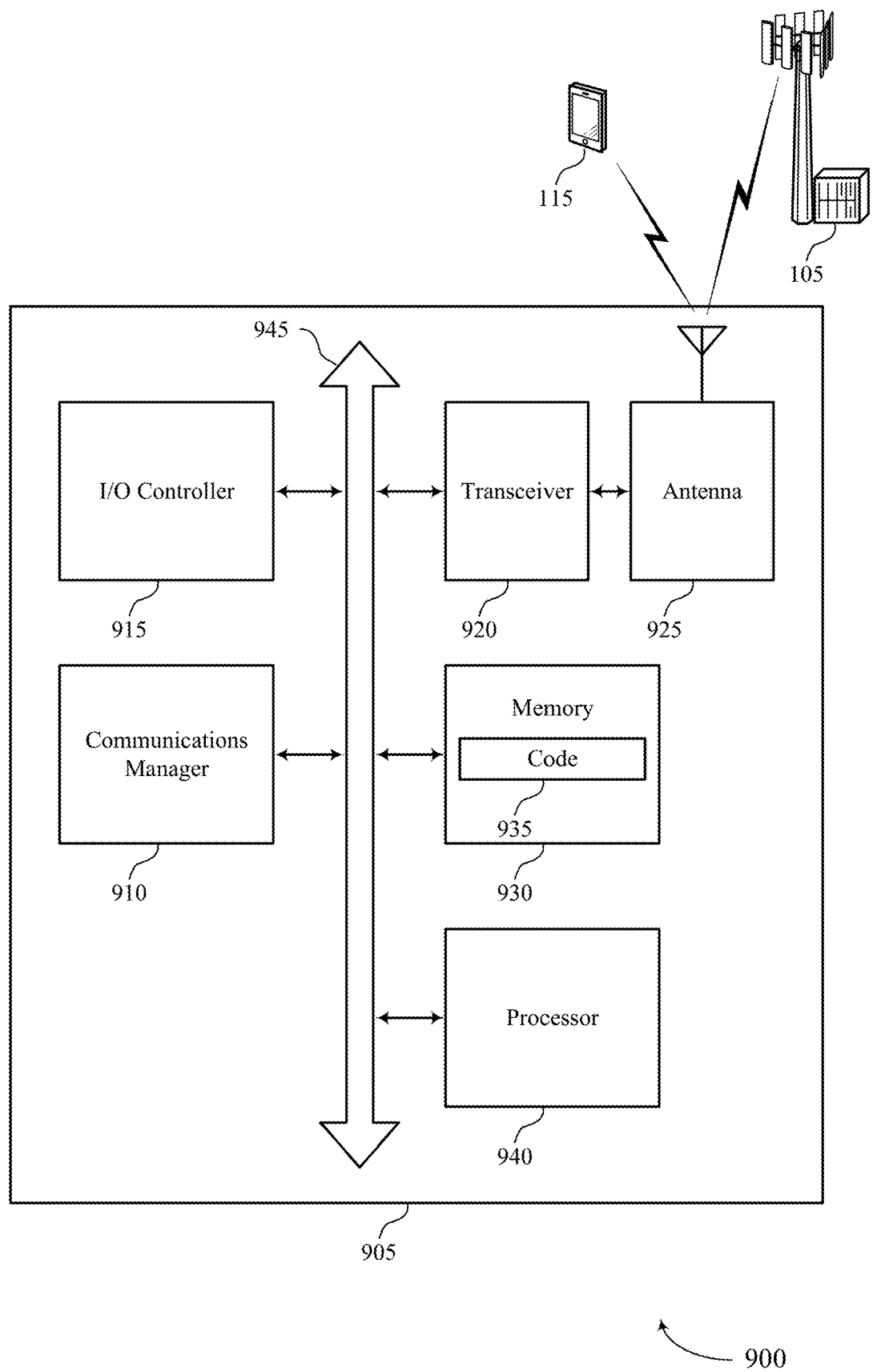
FIG. 9 shows a diagram of a system including a device that supports hierarchical beam search in accordance with aspects of the present disclosure.

FIG. 9 shows a diagram of a system 900 including a device 905 that supports hierarchical beam search in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, control signaling that configures the UE to monitor a set of SSBs and a set of reference signals, select a subset of the set of SSBs based on measuring a first signal metric for each SSB of the set of SSBs, select a reference signal subset of the set of reference signals that correspond to the subset of the set of SSBs, and communicate a data transmission with the base station using a first beam selected based on measuring a second signal metric for each reference signal in the reference signal subset.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting adaptive CSI-RS beam sub-selection based on SSB beam selection).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
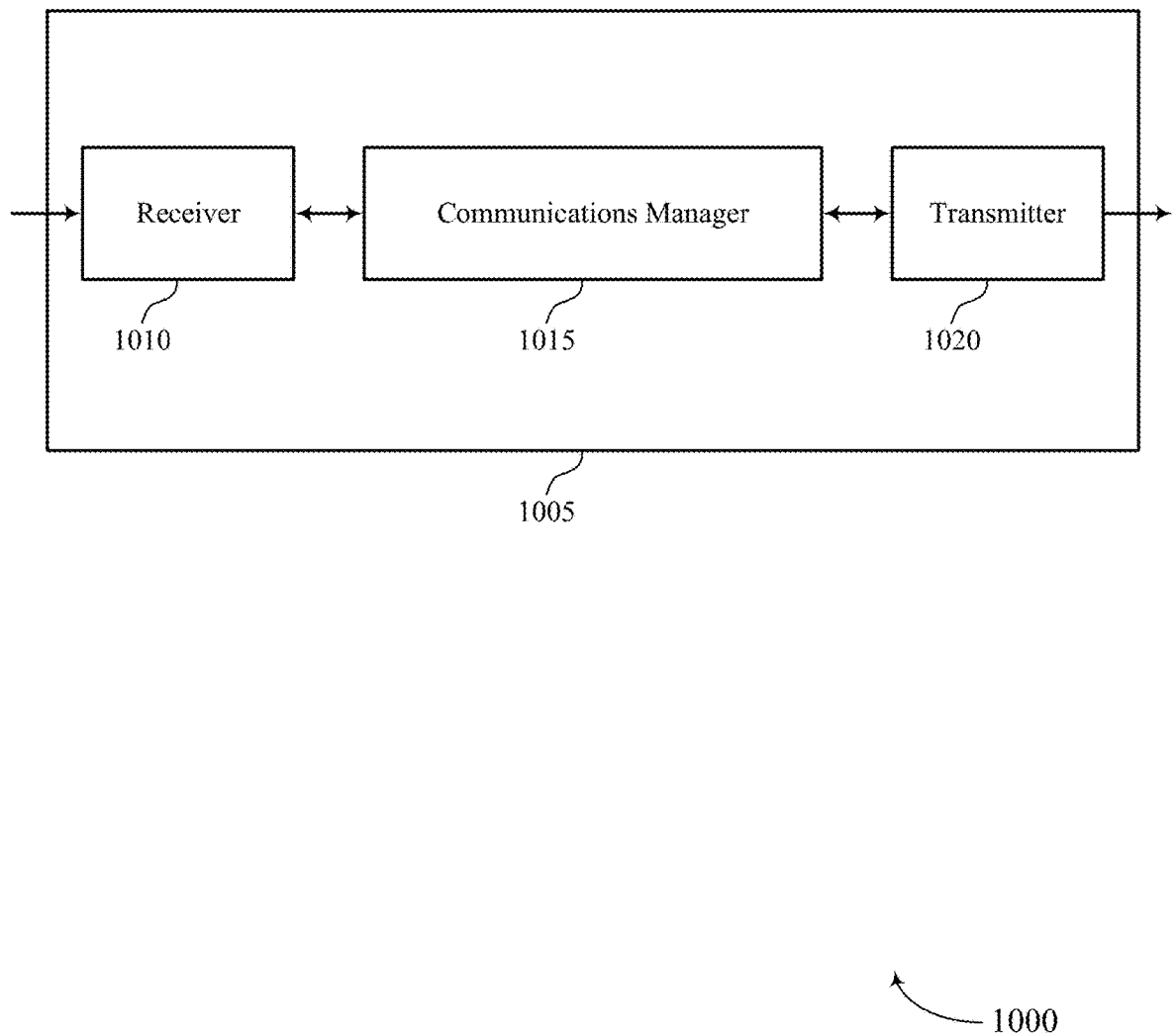
FIGS. 10 and 11 show block diagrams of devices that support hierarchical beam search in accordance with aspects of the present disclosure.

FIG. 10 shows a block diagram 1000 of a device 1005 that supports hierarchical beam search in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to adaptive CSI-RS beam sub-selection based on SSB beam selection, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width, transmit a set of synchronization signals within the set of SSBs and the set of reference signals, receive a measurement report indicating a reference signal subset of the set of reference signals and at least one corresponding signal metric, transmit a beam command instructing the UE to use a first beam of the second set of beams for communication with the base station based on the measurement report, and communicate a data transmission with the UE using the first beam. The communications manager 1015 may be an example of aspects of the communications manager 1310 described herein.

The communications manager 1015 as described herein may be implemented to realize one or more potential advantages. One implementation may allow the device 1005 to provide techniques which may support adaptive CSI-RS beam sub-selection based on SSB beam selection, among other advantages. For example, the device 1005 may include features for reducing power usage and processing cycles, as the device 1005 may communicate with a UE based on signal metrics associated with reference signals in a reference signal subset.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
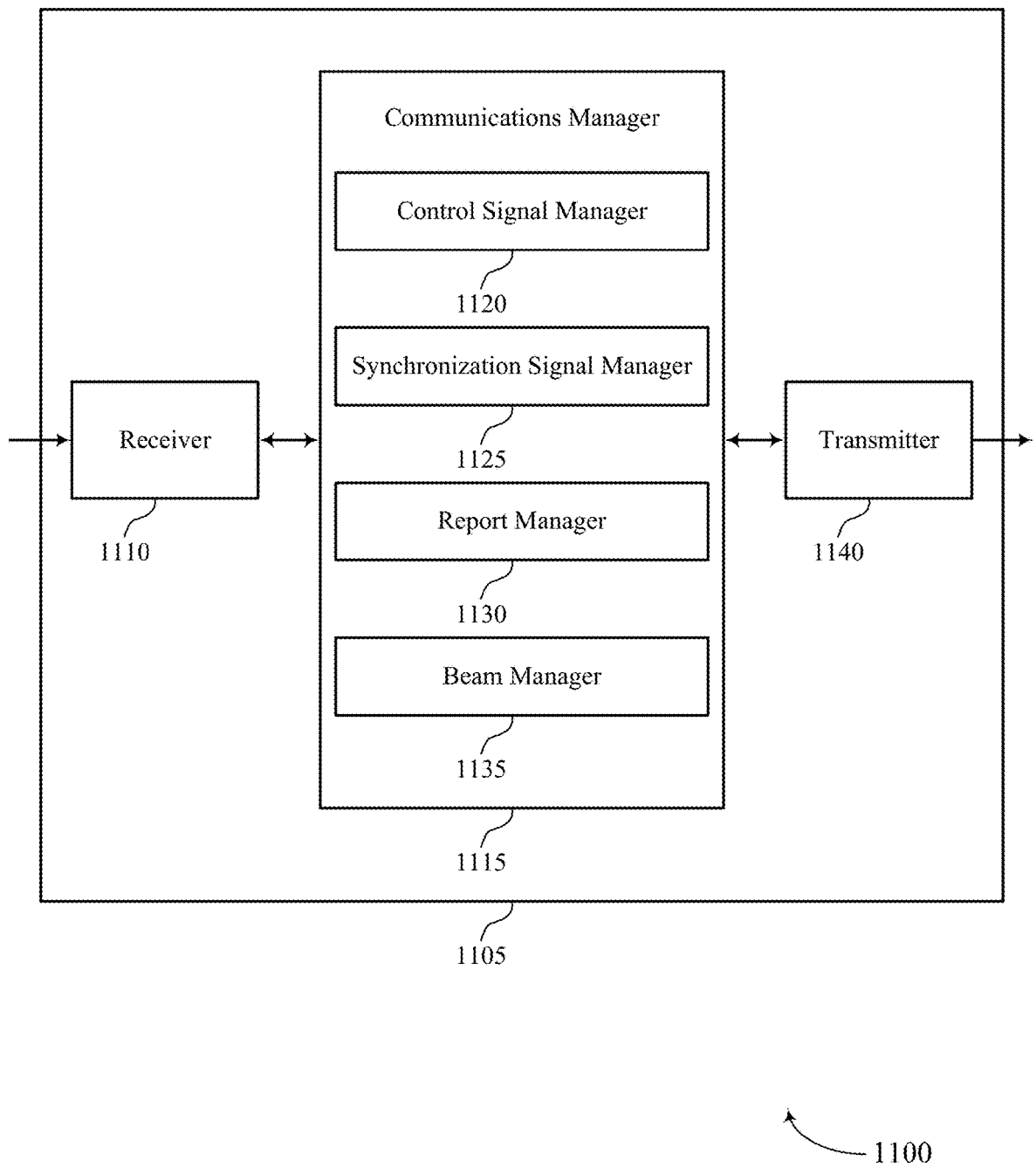

FIG. 11 shows a block diagram 1100 of a device 1105 that supports hierarchical beam search in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to adaptive CSI-RS beam sub-selection based on SSB beam selection, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control signal manager 1120, a synchronization signal manager 1125, a report manager 1130, and a beam manager 1135. The communications manager 1115 may be an example of aspects of the communications manager 1310 described herein.

The control signal manager 1120 may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width.

The synchronization signal manager 1125 may transmit a set of synchronization signals within the set of SSBs and the set of reference signals.

The report manager 1130 may receive a measurement report indicating a reference signal subset of the set of reference signals and at least one corresponding signal metric.

The beam manager 1135 may transmit a beam command instructing the UE to use a first beam of the second set of beams for communication with the base station based on the measurement report and communicate a data transmission with the UE using the first beam.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
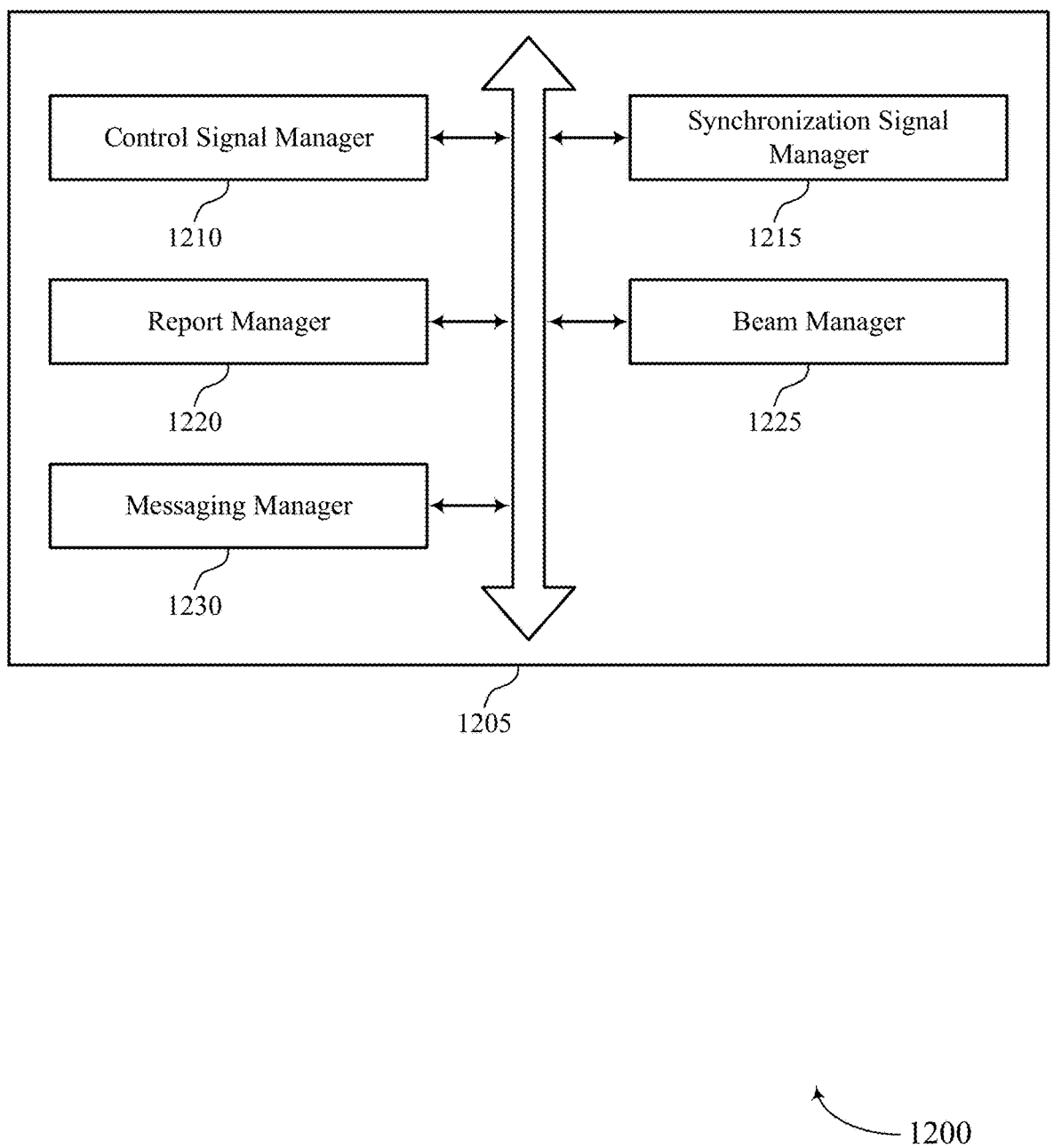
FIG. 12 shows a block diagram of a communications manager that supports hierarchical beam search in accordance with aspects of the present disclosure.

FIG. 12 shows a block diagram 1200 of a communications manager 1205 that supports hierarchical beam search in accordance with aspects of the present disclosure. The communications manager 1205 may be an example of aspects of a communications manager 1015, a communications manager 1115, or a communications manager 1310 described herein. The communications manager 1205 may include a control signal manager 1210, a synchronization signal manager 1215, a report manager 1220, a beam manager 1225, and a messaging manager 1230. Each of these modules may communicate, directly or indirectly, with one another (e.g., via one or more buses).

The control signal manager 1210 may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width.

The synchronization signal manager 1215 may transmit a set of synchronization signals within the set of SSBs and the set of reference signals.

In some examples, the synchronization signal manager 1215 may transmit a second set of synchronization signals within the set of SSBs and a second set of reference signals.

The report manager 1220 may receive a measurement report indicating a reference signal subset of the set of reference signals and at least one corresponding signal metric.

In some examples, the report manager 1220 may receive a measurement report indicating a second reference signal subset of the set of reference signals and at least one corresponding signal metric.

The beam manager 1225 may transmit a beam command instructing the UE to use a first beam of the second set of beams for communication with the base station based on the measurement report.

In some examples, the beam manager 1225 may communicate a data transmission with the UE using the first beam.

In some examples, the beam manager 1225 may transmit a beam command instructing the UE to use a second beam of the second set of beams for communication with the base station based on the measurement report.

In some examples, the beam manager 1225 may communicate a second data transmission with the UE using the second beam.

The messaging manager 1230 may transmit a message that indicates a QCL relationship between each beam of the second set of beams and a respective beam of the first set of beams.

Figure 13:
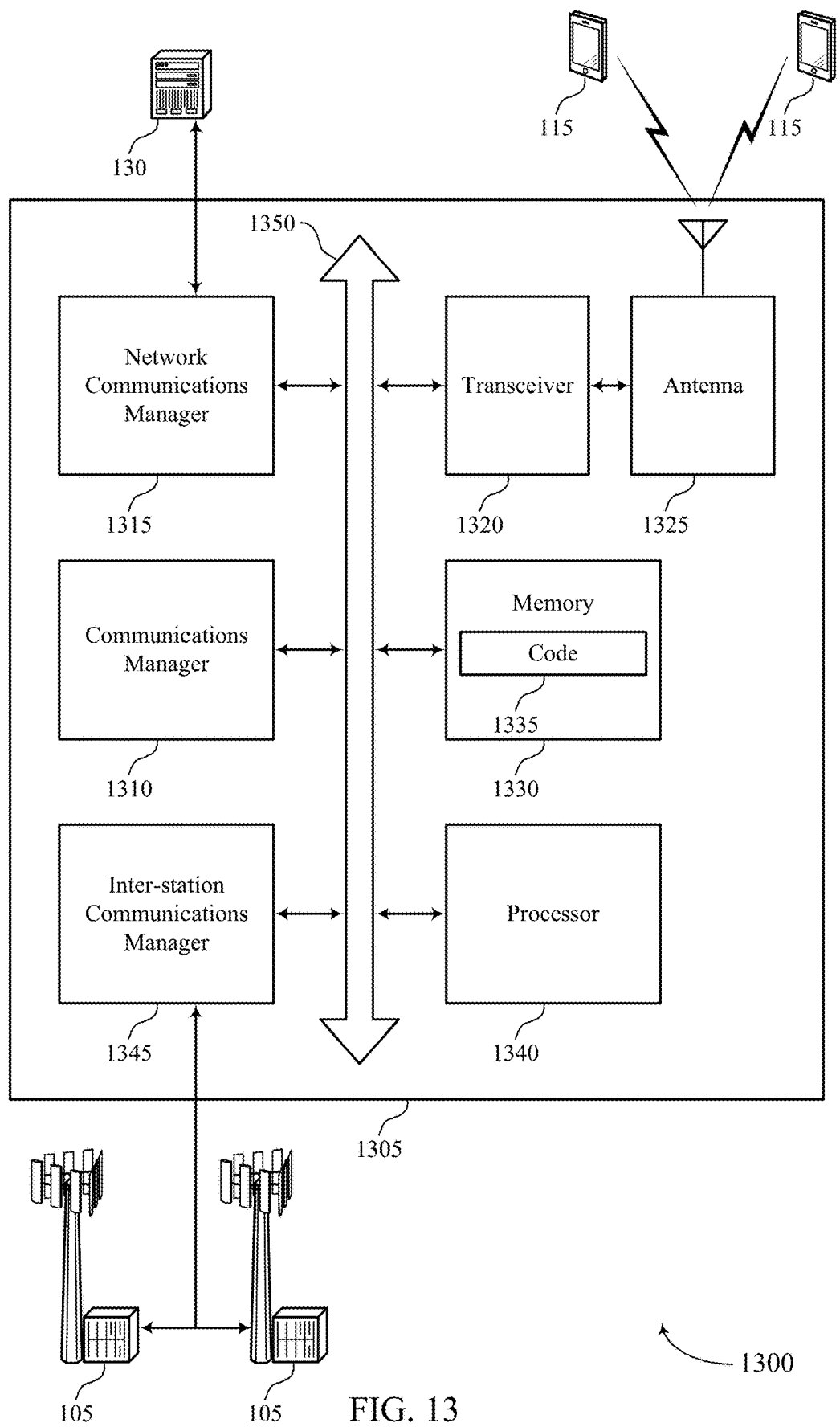
FIG. 13 shows a diagram of a system including a device that supports hierarchical beam search in accordance with aspects of the present disclosure.

FIG. 13 shows a diagram of a system 1300 including a device 1305 that supports hierarchical beam search in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width, transmit a set of synchronization signals within the set of SSBs and the set of reference signals, receive a measurement report indicating a reference signal subset of the set of reference signals and at least one corresponding signal metric, transmit a beam command instructing the UE to use a first beam of the second set of beams for communication with the base station based on the measurement report, and communicate a data transmission with the UE using the first beam.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting adaptive CSI-RS beam sub-selection based on SSB beam selection).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
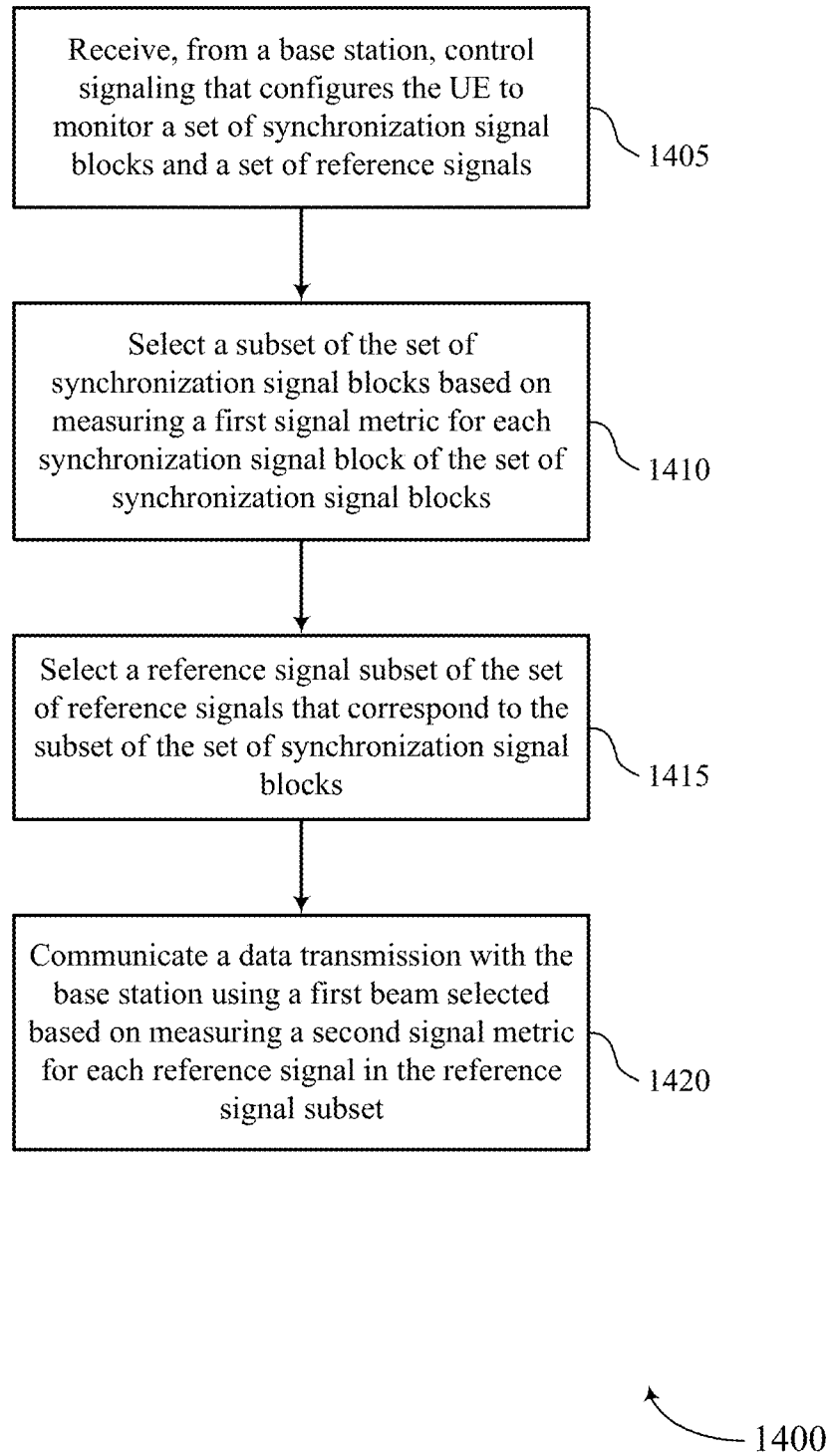
FIGS. 14 through 19 show flowcharts illustrating methods that support hierarchical beam search in accordance with aspects of the present disclosure.

FIG. 14 shows a flowchart illustrating a method 1400 that supports hierarchical beam search in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, control signaling that configures the UE to monitor a set of SSBs and a set of reference signals. The operations of 1405 may be performed according to the methods described herein. In some examples, aspects of the operations of 1405 may be performed by a monitoring manager as described with reference to FIGS. 6 through 9.

At 1410, the UE may select a subset of the set of SSBs based on measuring a first signal metric for each SSB of the set of SSBs. The operations of 1410 may be performed according to the methods described herein. In some examples, aspects of the operations of 1410 may be performed by a synchronization signal block manager as described with reference to FIGS. 6 through 9.

At 1415, the UE may select a reference signal subset of the set of reference signals that correspond to the subset of the set of SSBs. The operations of 1415 may be performed according to the methods described herein. In some examples, aspects of the operations of 1415 may be performed by a reference signal manager as described with reference to FIGS. 6 through 9.

At 1420, the UE may communicate a data transmission with the base station using a first beam selected based on measuring a second signal metric for each reference signal in the reference signal subset. The operations of 1420 may be performed according to the methods described herein. In some examples, aspects of the operations of 1420 may be performed by a beam manager as described with reference to FIGS. 6 through 9.

Figure 15:
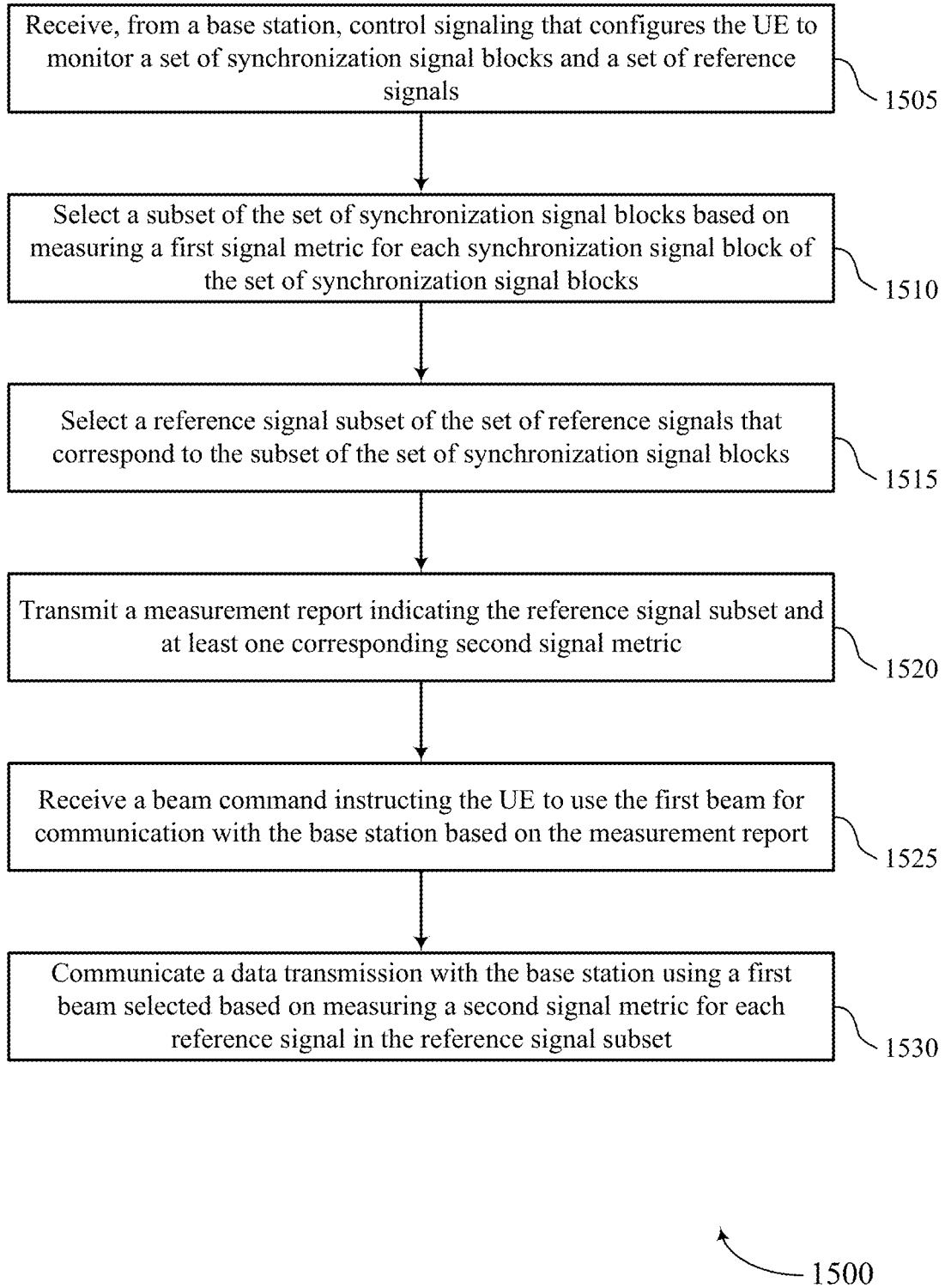

FIG. 15 shows a flowchart illustrating a method 1500 that supports hierarchical beam search in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, control signaling that configures the UE to monitor a set of SSBs and a set of reference signals. The operations of 1505 may be performed according to the methods described herein. In some examples, aspects of the operations of 1505 may be performed by a monitoring manager as described with reference to FIGS. 6 through 9.

At 1510, the UE may select a subset of the set of SSBs based on measuring a first signal metric for each SSB of the set of SSBs. The operations of 1510 may be performed according to the methods described herein. In some examples, aspects of the operations of 1510 may be performed by a synchronization signal block manager as described with reference to FIGS. 6 through 9.

At 1515, the UE may select a reference signal subset of the set of reference signals that correspond to the subset of the set of SSBs. The operations of 1515 may be performed according to the methods described herein. In some examples, aspects of the operations of 1515 may be performed by a reference signal manager as described with reference to FIGS. 6 through 9.

At 1520, the UE may transmit a measurement report indicating the reference signal subset and at least one corresponding second signal metric. The operations of 1520 may be performed according to the methods described herein. In some examples, aspects of the operations of 1520 may be performed by a Reporting Manager as described with reference to FIGS. 6 through 9.

At 1525, the UE may receive a beam command instructing the UE to use the first beam for communication with the base station based on the measurement report. The operations of 1525 may be performed according to the methods described herein. In some examples, aspects of the operations of 1525 may be performed by a beam manager as described with reference to FIGS. 6 through 9.

At 1530, the UE may communicate a data transmission with the base station using a first beam selected based on measuring a second signal metric for each reference signal in the reference signal subset. The operations of 1530 may be performed according to the methods described herein. In some examples, aspects of the operations of 1530 may be performed by a beam manager as described with reference to FIGS. 6 through 9.

Figure 16:
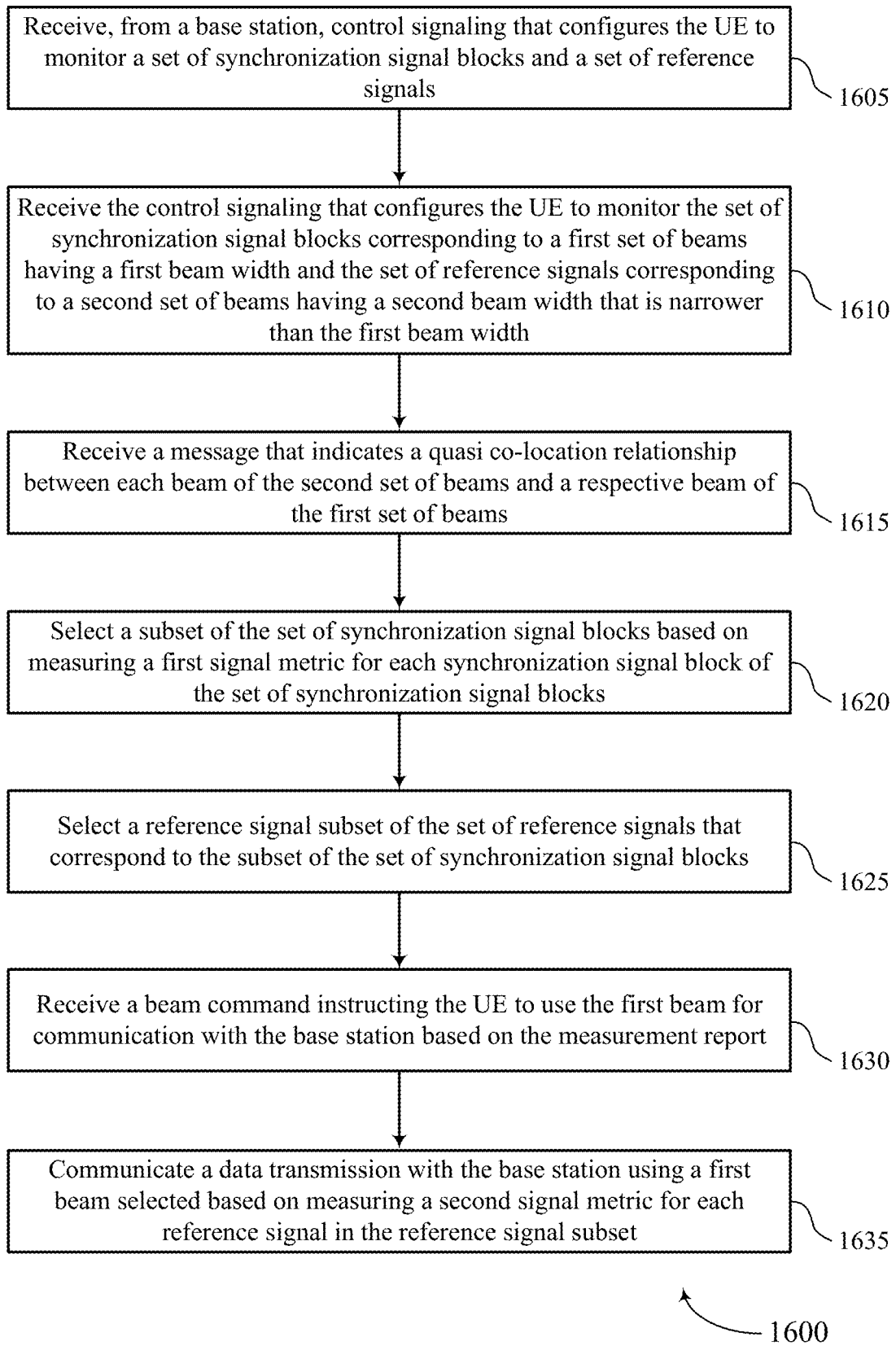

FIG. 16 shows a flowchart illustrating a method 1600 that supports hierarchical beam search in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, control signaling that configures the UE to monitor a set of SSBs and a set of reference signals. The operations of 1605 may be performed according to the methods described herein. In some examples, aspects of the operations of 1605 may be performed by a monitoring manager as described with reference to FIGS. 6 through 9.

At 1610, the UE may receive the control signaling that configures the UE to monitor the set of SSBs corresponding to a first set of beams having a first beam width and the set of reference signals corresponding to a second set of beams having a second beam width that is narrower than the first beam width. The operations of 1610 may be performed according to the methods described herein. In some examples, aspects of the operations of 1610 may be performed by a monitoring manager as described with reference to FIGS. 6 through 9.

At 1615, the UE may receive a message that indicates a QCL relationship between each beam of the second set of beams and a respective beam of the first set of beams. The operations of 1615 may be performed according to the methods described herein. In some examples, aspects of the operations of 1615 may be performed by a beam manager as described with reference to FIGS. 6 through 9.

At 1620, the UE may select a subset of the set of SSBs based on measuring a first signal metric for each SSB of the set of SSBs. The operations of 1620 may be performed according to the methods described herein. In some examples, aspects of the operations of 1620 may be performed by a synchronization signal block manager as described with reference to FIGS. 6 through 9.

At 1625, the UE may select a reference signal subset of the set of reference signals that correspond to the subset of the set of SSBs. The operations of 1625 may be performed according to the methods described herein. In some examples, aspects of the operations of 1625 may be performed by a reference signal manager as described with reference to FIGS. 6 through 9.

At 1630, the UE may receive a beam command instructing the UE to use the first beam for communication with the base station based on the measurement report. The operations of 1630 may be performed according to the methods described herein. In some examples, aspects of the operations of 1630 may be performed by a beam manager as described with reference to FIGS. 6 through 9.

At 1635, the UE may communicate a data transmission with the base station using a first beam selected based on measuring a second signal metric for each reference signal in the reference signal subset. The operations of 1635 may be performed according to the methods described herein. In some examples, aspects of the operations of 1635 may be performed by a beam manager as described with reference to FIGS. 6 through 9.

Figure 17:
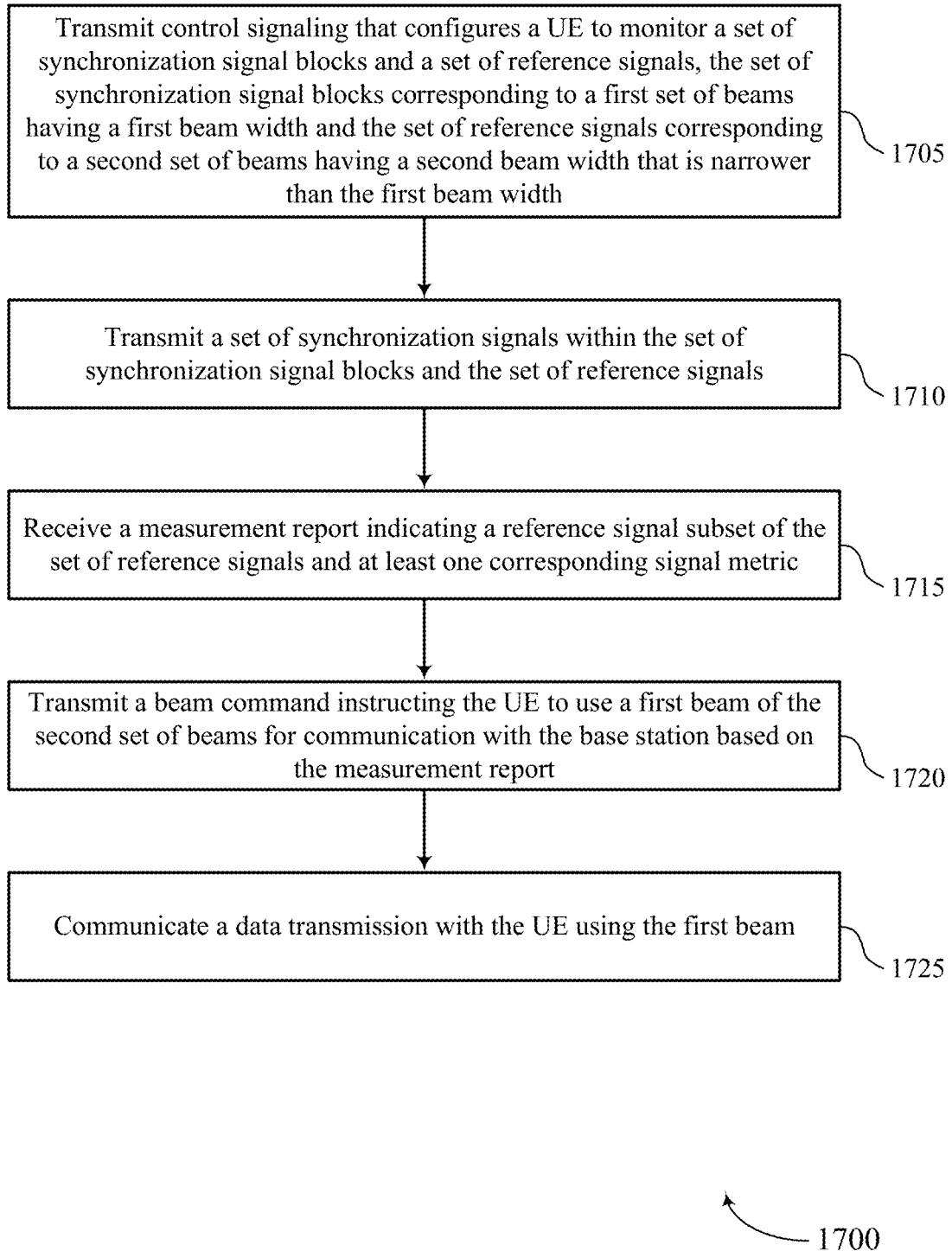

FIG. 17 shows a flowchart illustrating a method 1700 that supports hierarchical beam search in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width. The operations of 1705 may be performed according to the methods described herein. In some examples, aspects of the operations of 1705 may be performed by a control signal manager as described with reference to FIGS. 10 through 13.

At 1710, the base station may transmit a set of synchronization signals within the set of SSBs and the set of reference signals. The operations of 1710 may be performed according to the methods described herein. In some examples, aspects of the operations of 1710 may be performed by a synchronization signal manager as described with reference to FIGS. 10 through 13.

At 1715, the base station may receive a measurement report indicating a reference signal subset of the set of reference signals and at least one corresponding signal metric. The operations of 1715 may be performed according to the methods described herein. In some examples, aspects of the operations of 1715 may be performed by a report manager as described with reference to FIGS. 10 through 13.

At 1720, the base station may transmit a beam command instructing the UE to use a first beam of the second set of beams for communication with the base station based on the measurement report. The operations of 1720 may be performed according to the methods described herein. In some examples, aspects of the operations of 1720 may be performed by a beam manager as described with reference to FIGS. 10 through 13.

At 1725, the base station may communicate a data transmission with the UE using the first beam. The operations of 1725 may be performed according to the methods described herein. In some examples, aspects of the operations of 1725 may be performed by a beam manager as described with reference to FIGS. 10 through 13.

Figure 18:
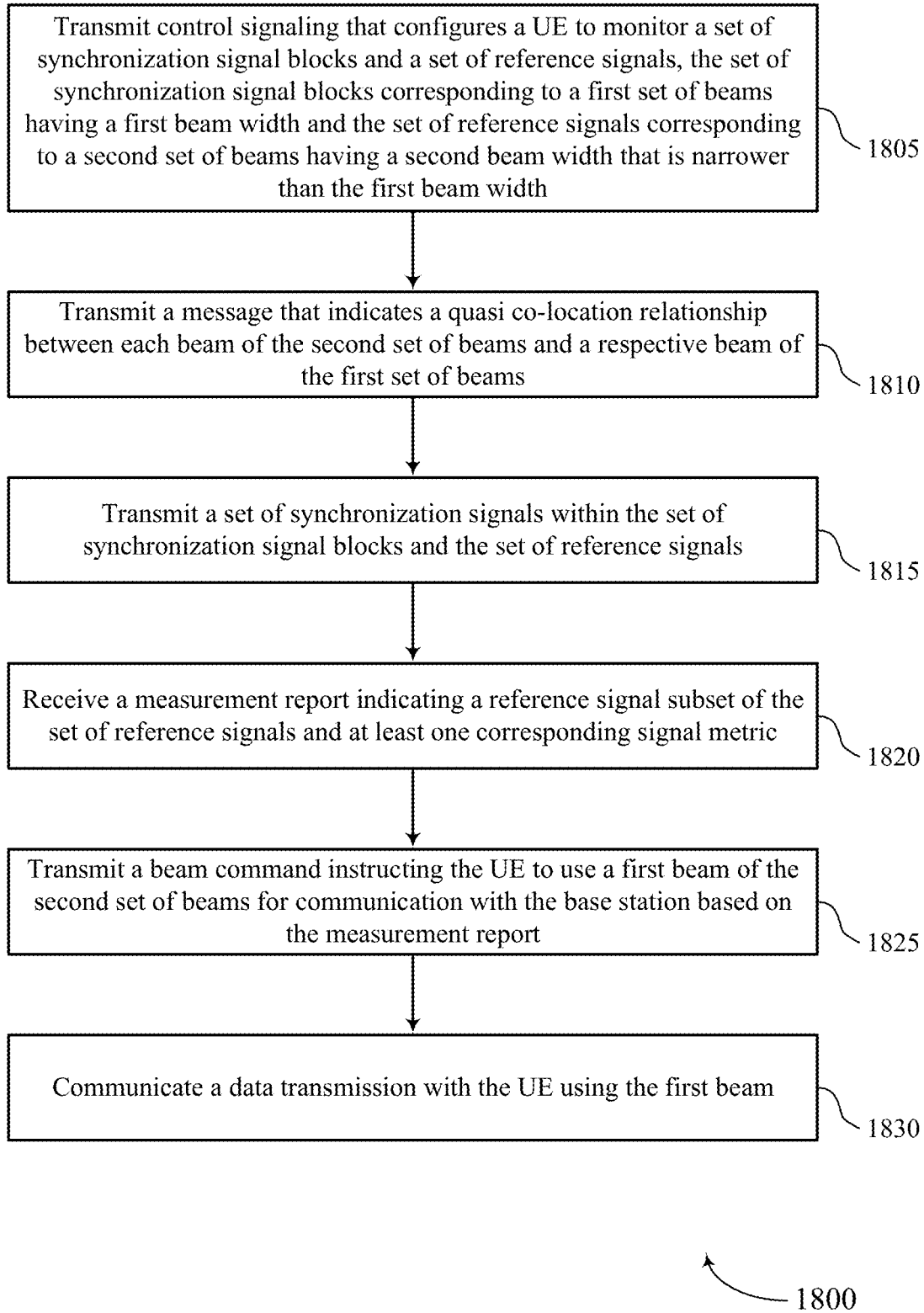

FIG. 18 shows a flowchart illustrating a method 1800 that supports hierarchical beam search in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width. The operations of 1805 may be performed according to the methods described herein. In some examples, aspects of the operations of 1805 may be performed by a control signal manager as described with reference to FIGS. 10 through 13.

At 1810, the base station may transmit a message that indicates a QCL relationship between each beam of the second set of beams and a respective beam of the first set of beams. The operations of 1810 may be performed according to the methods described herein. In some examples, aspects of the operations of 1810 may be performed by a messaging manager as described with reference to FIGS. 10 through 13.

At 1815, the base station may transmit a set of synchronization signals within the set of SSBs and the set of reference signals. The operations of 1815 may be performed according to the methods described herein. In some examples, aspects of the operations of 1815 may be performed by a synchronization signal manager as described with reference to FIGS. 10 through 13.

At 1820, the base station may receive a measurement report indicating a reference signal subset of the set of reference signals and at least one corresponding signal metric. The operations of 1820 may be performed according to the methods described herein. In some examples, aspects of the operations of 1820 may be performed by a report manager as described with reference to FIGS. 10 through 13.

At 1825, the base station may transmit a beam command instructing the UE to use a first beam of the second set of beams for communication with the base station based on the measurement report. The operations of 1825 may be performed according to the methods described herein. In some examples, aspects of the operations of 1825 may be performed by a beam manager as described with reference to FIGS. 10 through 13.

At 1830, the base station may communicate a data transmission with the UE using the first beam. The operations of 1830 may be performed according to the methods described herein. In some examples, aspects of the operations of 1830 may be performed by a beam manager as described with reference to FIGS. 10 through 13.

Figure 19:
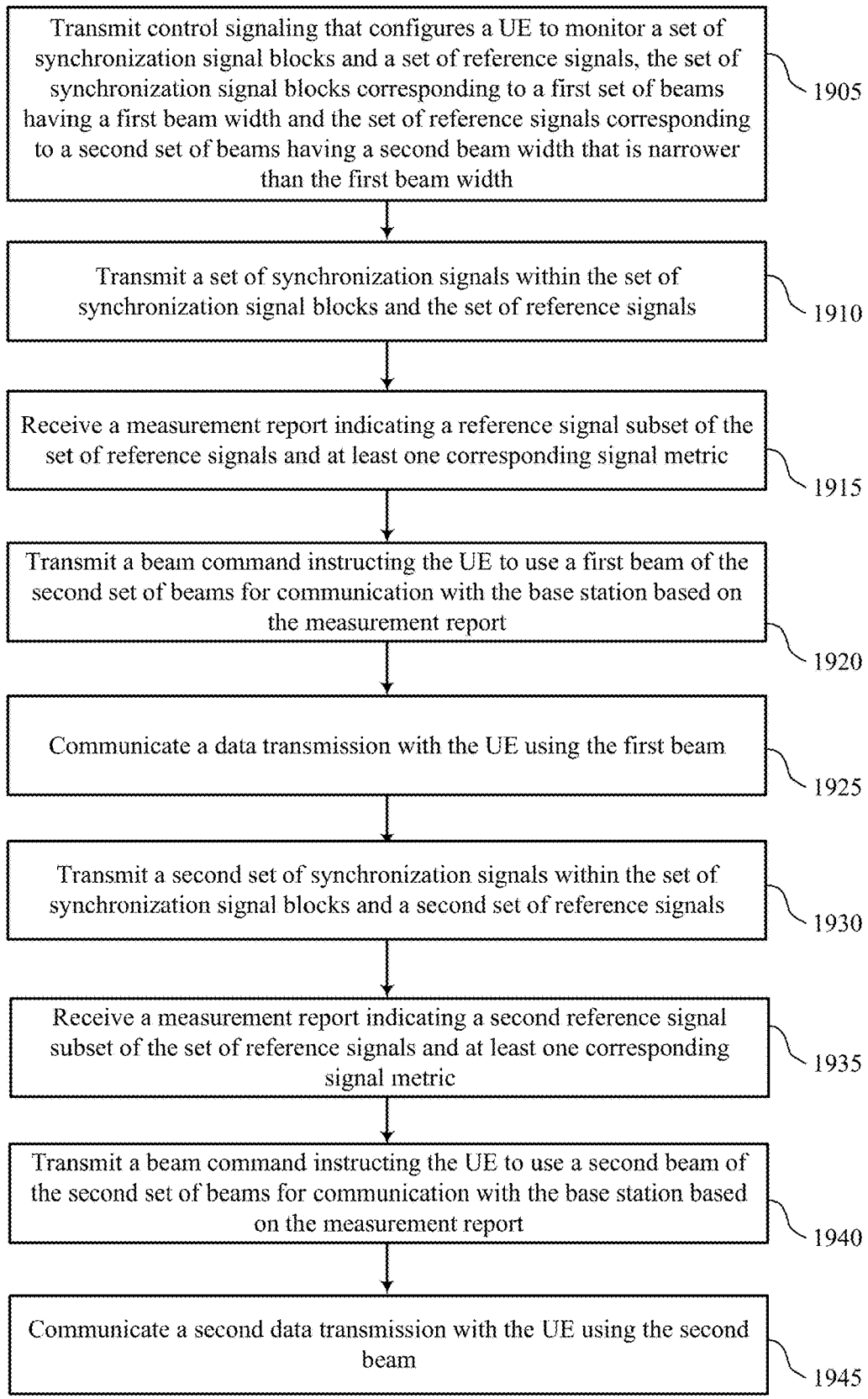

FIG. 19 shows a flowchart illustrating a method 1900 that supports hierarchical beam search in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may transmit control signaling that configures a UE to monitor a set of SSBs and a set of reference signals, the set of SSBs corresponding to a first set of beams having a first beam width and the set of reference signals corresponding to a second set of beams having a second beam width that is narrower than the first beam width. The operations of 1905 may be performed according to the methods described herein. In some examples, aspects of the operations of 1905 may be performed by a control signal manager as described with reference to FIGS. 10 through 13.

At 1910, the base station may transmit a set of synchronization signals within the set of SSBs and the set of reference signals. The operations of 1910 may be performed according to the methods described herein. In some examples, aspects of the operations of 1910 may be performed by a synchronization signal manager as described with reference to FIGS. 10 through 13.

At 1915, the base station may receive a measurement report indicating a reference signal subset of the set of reference signals and at least one corresponding signal metric. The operations of 1915 may be performed according to the methods described herein. In some examples, aspects of the operations of 1915 may be performed by a report manager as described with reference to FIGS. 10 through 13.

At 1920, the base station may transmit a beam command instructing the UE to use a first beam of the second set of beams for communication with the base station based on the measurement report. The operations of 1920 may be performed according to the methods described herein. In some examples, aspects of the operations of 1920 may be performed by a beam manager as described with reference to FIGS. 10 through 13.

At 1925, the base station may communicate a data transmission with the UE using the first beam. The operations of 1925 may be performed according to the methods described herein. In some examples, aspects of the operations of 1925 may be performed by a beam manager as described with reference to FIGS. 10 through 13.

At 1930, the base station may transmit a second set of synchronization signals within the set of SSBs and a second set of reference signals. The operations of 1930 may be performed according to the methods described herein. In some examples, aspects of the operations of 1930 may be performed by a synchronization signal manager as described with reference to FIGS. 10 through 13.

At 1935, the base station may receive a measurement report indicating a second reference signal subset of the set of reference signals and at least one corresponding signal metric. The operations of 1935 may be performed according to the methods described herein. In some examples, aspects of the operations of 1935 may be performed by a report manager as described with reference to FIGS. 10 through 13.

At 1940, the base station may transmit a beam command instructing the UE to use a second beam of the second set of beams for communication with the base station based on the measurement report. The operations of 1940 may be performed according to the methods described herein. In some examples, aspects of the operations of 1940 may be performed by a beam manager as described with reference to FIGS. 10 through 13.

At 1945, the base station may communicate a second data transmission with the UE using the second beam. The operations of 1945 may be performed according to the methods described herein. In some examples, aspects of the operations of 1945 may be performed by a beam manager as described with reference to FIGS. 10 through 13.

Embodiment 1: A method for wireless communications by a UE, comprising: receiving, from a base station, control signaling that configures the UE to monitor a plurality of synchronization signal blocks and a plurality of reference signals; selecting a subset of the plurality of synchronization signal blocks based at least in part on measuring a first signal metric for each synchronization signal block of the plurality of synchronization signal blocks; selecting a reference signal subset of the plurality of reference signals that correspond to the subset of the plurality of synchronization signal blocks; and communicating a data transmission with the base station using a first beam selected based at least in part on measuring a second signal metric for each reference signal in the reference signal subset.

Embodiment 2: The method of embodiment 1, further comprising: transmitting a measurement report indicating the reference signal subset and at least one corresponding second signal metric; and receiving a beam command instructing the UE to use the first beam for communication with the base station based at least in part on the measurement report.

Embodiment 3: The method of any of embodiments 1 or 2, wherein receiving the control signaling comprises: receiving the control signaling that configures the UE to monitor the plurality of synchronization signal blocks corresponding to a first set of beams having a first beam width and the plurality of reference signals corresponding to a second set of beams having a second beam width that is narrower than the first beam width.

Embodiment 4: The method of embodiment 3, further comprising: receiving a message that indicates a QCL relationship between each beam of the second set of beams and a respective beam of the first set of beams.

Embodiment 5: The method of any of embodiment 3, wherein selecting the subset of the plurality of synchronization signal blocks comprises: selecting the subset of the plurality of synchronization signal blocks that corresponds to a subset of the first set of beams.

Embodiment 6: The method of embodiment 5, wherein selecting the reference signal subset comprises: selecting the reference signal subset of the plurality of reference signals that corresponds to a subset of the second set of beams, wherein each beam of the subset of the second set of beams has a QCL relationship with a beam of the subset of the first set of beams.

Embodiment 7: The method of any of embodiments 1 to 6, wherein selecting the subset of the plurality of synchronization signal blocks comprises: selecting a first subset of the plurality of synchronization signal blocks on a first component carrier and a second subset of the plurality of synchronization signal blocks on a second component carrier.

Embodiment 8: The method of any of embodiments 1 to 7, wherein selecting the subset of the plurality of synchronization signal blocks comprises: selecting the subset of the plurality of synchronization signal blocks across one or more component carriers.

Embodiment 9: The method of any of embodiments 1 to 8, further comprising: selecting a second subset of the plurality of synchronization signal blocks based at least in part on generating an updated measurement of the first signal metric for each synchronization signal block of the plurality of synchronization signal blocks; selecting a second reference signal subset of the plurality of reference signals that correspond to the second subset of the plurality of synchronization signal blocks; and communicating a second data transmission with the base station using a second beam selected based at least in part on generating an updated measurement of the second signal metric for each reference signal in the second reference signal subset.

Embodiment 10: The method of embodiment 9, wherein the first beam is different than the second beam.

Embodiment 11: The method of any of embodiments 1 to 10, wherein the first signal metric is an RSRP metric, an SINR, an SNR, a channel statistic, a second order channel statistic, or any combination thereof.

Embodiment 12: The method of any of embodiments 1 to 11, wherein the second signal metric is an RSRP metric, an SINR, an SNR, a channel statistic, a second order channel statistic, or any combination thereof.

Embodiment 13: The method of any of embodiments 1 to 12, wherein the plurality of reference signals are channel state information reference signals.

Embodiment 14. A method for wireless communications by a base station, comprising: transmitting control signaling that configures a UE to monitor a plurality of synchronization signal blocks and a plurality of reference signals, the plurality of synchronization signal blocks corresponding to a first set of beams having a first beam width and the plurality of reference signals corresponding to a second set of beams having a second beam width that is narrower than the first beam width; transmitting a plurality of synchronization signals within the plurality of synchronization signal blocks and the plurality of reference signals; receiving a measurement report indicating a reference signal subset of the plurality of reference signals and at least one corresponding signal metric; transmitting a beam command instructing the UE to use a first beam of the second set of beams for communication with the base station based at least in part on the measurement report; and communicating a data transmission with the UE using the first beam.

Embodiment 15: The method of embodiment 14, further comprising: transmitting a message that indicates a QCL relationship between each beam of the second set of beams and a respective beam of the first set of beams.

Embodiment 16: The method of any of embodiments 14 or 15, further comprising: transmitting a second plurality of synchronization signals within the plurality of synchronization signal blocks and a second plurality of reference signals; receiving a measurement report indicating a second reference signal subset of the plurality of reference signals and at least one corresponding signal metric; transmitting a beam command instructing the UE to use a second beam of the second set of beams for communication with the base station based at least in part on the measurement report; and communicating a second data transmission with the UE using the second beam.

Embodiment 17: The method of embodiment 16, wherein the first beam is different than the second beam.

Embodiment 18: The method of any of embodiments 14 to 17, wherein a first signal metric of the at least one corresponding signal metric is an RSRP metric, an SINR, an SNR, a channel statistic, a second order channel statistic, or any combination thereof.

Embodiment 19: The method of any of embodiments 14 to 18, wherein a second signal metric of the at least one corresponding signal metric is an RSRP metric, an SINR, an SNR, a channel statistic, a second order channel statistic, or any combination thereof.

Embodiment 20: The method of any of embodiments 14 to 19, wherein the plurality of reference signals are channel state information reference signals.

Embodiment 21: An apparatus comprising at least one means for performing a method of any of embodiments 1 to 13.

Embodiment 22: An apparatus for wireless communications comprising a processor; memory in electronic communication with the processor; and instructions stored in the memory and executable by the processor to cause the apparatus to perform a method of any of embodiments 1 to 13.

Embodiment 23: A non-transitory computer-readable medium storing code for wireless communications, the code comprising instructions executable by a processor to perform a method of any of embodiments 1 to 13.

Embodiment 24: An apparatus comprising at least one means for performing a method of any of embodiments 14 to 20.

Embodiment 25: An apparatus for wireless communications comprising a processor; memory in electronic communication with the processor; and instructions stored in the memory and executable by the processor to cause the apparatus to perform a method of any of embodiments 14 to 20.

Embodiment 26: A non-transitory computer-readable medium storing code for wireless communications, the code comprising instructions executable by a processor to perform a method of any of embodiments 14 to 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving, from a network device, control signaling that configures the UE to monitor a plurality of synchronization signal blocks and a plurality of reference signals;
   selecting a subset of the plurality of synchronization signal blocks based at least in part on measuring a first signal metric for each synchronization signal block of the plurality of synchronization signal blocks;
   selecting a reference signal subset of the plurality of reference signals, where each reference signal in the reference signal subset has a quasi co-location relationship with at least one respective synchronization signal block of the subset of the plurality of synchronization signal blocks, wherein each respective synchronization signal block of the subset of the plurality of synchronization signal blocks corresponds to a respective beam in a first set of beams and each reference signal in the reference signal subset corresponds to a respective beam in a second set of beams, and wherein each of the quasi co-location relationships indicates a respective quasi co-location relationship between a respective beam in the first set of beams and one or more beams in the second set of beams; and
   communicating a first data transmission with the network device using a first beam selected from the second set of beams based at least in part on measuring a second signal metric for each reference signal in the reference signal subset.

2. The method of claim 1, further comprising:
   transmitting a measurement report indicating the reference signal subset and at least one corresponding second signal metric; and
   receiving a beam command instructing the UE to use the first beam for communication with the network device based at least in part on the measurement report.

3. The method of claim 1, wherein receiving the control signaling comprises:
   receiving the control signaling that configures the UE to monitor the plurality of synchronization signal blocks corresponding to a first set of beams having a first beam width and the plurality of reference signals corresponding to a second set of beams having a second beam width that is narrower than the first beam width.

4. The method of claim 3, further comprising:
   receiving a message that indicates a quasi co-location relationship between each beam of the second set of beams and a respective beam of the first set of beams.

5. The method of claim 3, wherein selecting the subset of the plurality of synchronization signal blocks comprises:
   selecting the subset of the plurality of synchronization signal blocks that corresponds to a subset of the first set of beams.

6. The method of claim 5, wherein selecting the reference signal subset comprises:
   selecting the reference signal subset of the plurality of reference signals that corresponds to a subset of the second set of beams, wherein each beam of the subset of the second set of beams has a quasi co-location relationship with a beam of the subset of the first set of beams.

7. The method of claim 1, wherein selecting the subset of the plurality of synchronization signal blocks comprises:
   selecting a first subset of the plurality of synchronization signal blocks on a first component carrier and a second subset of the plurality of synchronization signal blocks on a second component carrier.

8. The method of claim 1, wherein selecting the subset of the plurality of synchronization signal blocks comprises:
   selecting the subset of the plurality of synchronization signal blocks across one or more component carriers.

9. The method of claim 1, further comprising:
   selecting a second subset of the plurality of synchronization signal blocks based at least in part on generating an updated measurement of the first signal metric for each synchronization signal block of the plurality of synchronization signal blocks;
   selecting a second reference signal subset of the plurality of reference signals that correspond to the second subset of the plurality of synchronization signal blocks; and
   communicating a second data transmission with the network device using a second beam selected based at least in part on generating an updated measurement of the second signal metric for each reference signal in the second reference signal subset.

10. The method of claim 9, wherein the first beam is different than the second beam.

11. The method of claim 1, wherein the first signal metric is a reference signal receive power (RSRP) metric, a signal to interference plus noise ratio (SINR), a signal to noise ratio (SNR), a channel statistic, a second order channel statistic, or any combination thereof.

12. The method of claim 1, wherein the second signal metric is a reference signal receive power (RSRP) metric, a signal to interference plus noise ratio (SINR), a signal to noise ratio (SNR), a channel statistic, a second order channel statistic, or any combination thereof.

13. The method of claim 1, wherein the plurality of reference signals are channel state information reference signals.

14. A method for wireless communications by a network device, comprising:
   transmitting control signaling that configures a user equipment (UE) to monitor a plurality of synchronization signal blocks and a plurality of reference signals, the plurality of synchronization signal blocks corresponding to a first set of beams having a first beam width and the plurality of reference signals corresponding to a second set of beams having a second beam width that is narrower than the first beam width;
   transmitting a plurality of synchronization signals within the plurality of synchronization signal blocks and the plurality of reference signals;
   receiving a measurement report indicating a reference signal subset of the plurality of reference signals and at least one corresponding signal metric, wherein each reference signal in the reference signal subset has a quasi co-location relationship with at least one respective synchronization signal block of a subset of the plurality of synchronization signal blocks, wherein each respective synchronization signal block of the subset of the plurality of synchronization signal blocks corresponds to a respective beam in a first set of beams and each reference signal in the reference signal subset corresponds to a respective beam in a second set of beams, and wherein each of the quasi co-location relationships indicates a respective quasi co-location relationship between a respective beam in the first set of beams and one or more beams in the second set of beams;

transmitting a beam command instructing the UE to use a first beam of the second set of beams for communication with the network device based at least in part on the measurement report; and communicating a first data transmission with the UE using the first beam from the second set of beams.

15. The method of claim 14, further comprising:
transmitting a message that indicates the quasi co-location relationship between each respective beam of the second set of beams and the respective beam of the first set of beams.

16. The method of claim 14, further comprising:
transmitting a second plurality of synchronization signals within the plurality of synchronization signal blocks and a second plurality of reference signals;
receiving a measurement report indicating a second reference signal subset of the plurality of reference signals and at least one corresponding signal metric;
transmitting a beam command instructing the UE to use a second beam of the second set of beams for communication with the network device based at least in part on the measurement report; and
communicating a second data transmission with the UE using the second beam.

17. The method of claim 16, wherein the first beam is different than the second beam.

18. The method of claim 14, wherein the at least one corresponding metric is a reference signal receive power (RSRP) metric, a signal to interference plus noise ratio (SINR), a signal to noise ratio (SNR), a channel statistic, a second order channel statistic, or any combination thereof.

19. The method of claim 14, wherein the plurality of reference signals are channel state information reference signals.

20. An apparatus for wireless communications by a user equipment (UE), comprising:
a processor, memory coupled with the processor; and
instructions stored in the memory and executable by the processor to cause the apparatus to:
receive, from a network device, control signaling that configures the UE to monitor a plurality of synchronization signal blocks and a plurality of reference signals;
select a subset of the plurality of synchronization signal blocks based at least in part on measuring a first signal metric for each synchronization signal block of the plurality of synchronization signal blocks;
select a reference signal subset of the plurality of reference signals, wherein each reference signal in the reference signal subset has a quasi co-location relationship with at least one respective synchronization signal block of the subset of the plurality of synchronization signal blocks, wherein each respective synchronization signal block of the subset of the plurality of synchronization signal blocks corresponds to a respective beam in a first set of beams and each reference signal in the reference signal subset corresponds to a respective beam in a second set of beams, and wherein each of the quasi co-location relationships indicates a respective quasi co-location relationship between a respective beam in the first set of beams and one or more beams in the second set of beams; and communicate a first data transmission with the network device using a first beam selected from the second set of beams based at least in part on measuring a second signal metric for each reference signal in the reference signal subset.

21. The apparatus of claim 20, wherein the instructions are further executable by the processor to cause the apparatus to:
transmit a measurement report indicating the reference signal subset and at least one corresponding second signal metric; and
receive a beam command instructing the UE to use the first beam for communication with the network device based at least in part on the measurement report.

22. The apparatus of claim 20, wherein the instructions to receive the control signaling are executable by the processor to cause the apparatus to:
receive the control signaling that configures the UE to monitor the plurality of synchronization signal blocks corresponding to a first set of beams having a first beam width and the plurality of reference signals corresponding to a second set of beams having a second beam width that is narrower than the first beam width.

23. The apparatus of claim 22, wherein the instructions are further executable by the processor to cause the apparatus to:
receive a message that indicates a quasi co-location relationship between each beam of the second set of beams and a respective beam of the first set of beams.

24. The apparatus of claim 22, wherein the instructions to select the subset of the plurality of synchronization signal blocks are executable by the processor to cause the apparatus to:
select the subset of the plurality of synchronization signal blocks that corresponds to a subset of the first set of beams.

25. The apparatus of claim 24, wherein the instructions to select the reference signal subset are executable by the processor to cause the apparatus to:
select the reference signal subset of the plurality of reference signals that corresponds to a subset of the second set of beams, wherein each beam of the subset of the second set of beams has a quasi co-location relationship with a beam of the subset of the first set of beams.

26. The apparatus of claim 20, wherein the instructions to select the subset of the plurality of synchronization signal blocks are executable by the processor to cause the apparatus to:
select a first subset of the plurality of synchronization signal blocks on a first component carrier and a second subset of the plurality of synchronization signal blocks on a second component carrier.

27. An apparatus for wireless communications by a network device, comprising:
a processor, memory coupled with the processor; and
instructions stored in the memory and executable by the processor to cause the apparatus to:

transmit control signaling that configures a user equipment (UE) to monitor a plurality of synchronization signal blocks and a plurality of reference signals, the plurality of synchronization signal blocks corresponding to a first set of beams having a first beam width and the plurality of reference signals corresponding to a second set of beams having a second beam width that is narrower than the first beam width;

transmit a plurality of synchronization signals within the plurality of synchronization signal blocks and the plurality of reference signals;

receive a measurement report indicating a reference signal subset of the plurality of reference signals and at least one corresponding signal metric, wherein each reference signal in the reference signal subset has a quasi co-location relationship with at least one respective synchronization signal block of a subset of the plurality of synchronization signal blocks, wherein each respective synchronization signal block of the subset of the plurality of synchronization signal blocks corresponds to a respective beam in a first set of beams and each reference signal in the reference signal subset corresponds to a respective beam in a second set of beams, and wherein each of the quasi co-location relationships indicates a respective quasi co-location relationship between a respective beam in the first set of beams and one or more beams in the second set of beams;

transmit a beam command instructing the UE to use a first beam of the second set of beams for communication with the network device based at least in part on the measurement report; and communicate a data transmission with the UE using the first beam from the second set of beams.

28. The apparatus of claim 27, wherein the instructions are further executable by the processor to cause the apparatus to:

transmit a message that indicates the quasi co-location relationship between each respective beam of the second set of beams and the respective beam of the first set of beams.

29. The apparatus of claim 27, wherein the instructions are further executable by the processor to cause the apparatus to:

transmit a second plurality of synchronization signals within the plurality of synchronization signal blocks and a second plurality of reference signals;

receive a measurement report indicating a second reference signal subset of the plurality of reference signals and at least one corresponding signal metric;

transmit a beam command instructing the UE to use a second beam of the second set of beams for communication with the network device based at least in part on the measurement report; and communicate a second data transmission with the UE using the second beam.

30. The apparatus of claim 27, wherein the plurality of reference signals are channel state information reference signals.

* * * * *